(12) United States Patent
Kanenobu

(10) Patent No.: US 10,731,674 B2
(45) Date of Patent: Aug. 4, 2020

(54) METHOD FOR FORMING HYDRAULIC ACTUATOR HYDRAULIC OIL PASSAGE

(71) Applicants: Kanzaki Kokyukoki Mfg. Co., Ltd., Amagasaki-shi, Hyogo (JP); Yanmar Co., Ltd., Osaka-shi, Osaka (JP)

(72) Inventor: Hideki Kanenobu, Amagasaki (JP)

(73) Assignee: Kanzai Kokyukoki Mfg. Co., Ltd., Amagasaki-shi, Hyogo (JP)

( * ) Notice: Subject to any disclaimer, the term of this patent is extended or adjusted under 35 U.S.C. 154(b) by 169 days.

(21) Appl. No.: 15/749,892

(22) PCT Filed: Aug. 18, 2016

(86) PCT No.: PCT/JP2016/074137
§ 371 (c)(1),
(2) Date: Feb. 2, 2018

(87) PCT Pub. No.: WO2017/030168
PCT Pub. Date: Feb. 23, 2017

(65) Prior Publication Data
US 2018/0231030 A1    Aug. 16, 2018

(30) Foreign Application Priority Data

Aug. 19, 2015 (JP) .................................. 2015-161592

(51) Int. Cl.
*F15B 11/032* (2006.01)
*F16K 27/00* (2006.01)
(Continued)

(52) U.S. Cl.
CPC .......... *F15B 11/032* (2013.01); *E02F 9/2257* (2013.01); *F15B 11/00* (2013.01);
(Continued)

(58) Field of Classification Search
CPC .. F15B 11/032; F15B 13/024; F15B 13/0842; F15B 21/04; F15B 11/00; E02F 9/2257; F16K 27/003; F16K 27/00
See application file for complete search history.

(56) References Cited

U.S. PATENT DOCUMENTS 5,277,027 A *  1/1994  Aoyagi ................. E02F 9/2232
                                                        60/420
7,913,713 B2 * 3/2011  Nelson .................... B60P 1/162
                                                        137/354
(Continued)

FOREIGN PATENT DOCUMENTS

JP       53-069688 U    6/1978
JP       H06-42127      11/1994
(Continued)

OTHER PUBLICATIONS

International Search Report of PCT/JP2016/074137 dated Nov. 15, 2016.

*Primary Examiner* — Darlene P Condra
(74) *Attorney, Agent, or Firm* — Sterne, Kessler, Goldstein & Fox P.L.L.C.

(57) ABSTRACT

A method for forming hydraulic oil passages for hydraulic actuators according to an aspect of the present invention includes: forming a valve block mount surface including first and second regions on an outer surface of a housing; collecting valves for hydraulic actuators belonging to a main function group to a main function valve block that is mountable directly or indirectly on the first region; collecting valves for hydraulic actuators belonging to an additional function group to an additional function valve block that is mountable directly or indirectly on the second region; and mounting the valve blocks on corresponding regions of the valve block mount surface, and thereby, the hydraulic actuators to be mounted are fluidly connected to each other so that (Continued)

the hydraulic actuators are operable by using hydraulic oil from a common oil source.

18 Claims, 18 Drawing Sheets

(51) Int. Cl.
    *F15B 11/00*     (2006.01)
    *E02F 9/22*     (2006.01)
    *F15B 13/02*     (2006.01)
    *F15B 13/08*     (2006.01)
    *F15B 21/04*     (2019.01)

(52) U.S. Cl.
    CPC ........ *F15B 13/024* (2013.01); *F15B 13/0842* (2013.01); *F15B 21/04* (2013.01); *F16K 27/00* (2013.01); *F16K 27/003* (2013.01)

(56) References Cited

U.S. PATENT DOCUMENTS

| | | | |
|---|---|---|---|
| 9,494,171 B2* | 11/2016 | Kobayashi | F15B 13/0842 |
| 9,663,923 B2* | 5/2017 | Hart | E02F 9/2267 |
| 2002/0129856 A1* | 9/2002 | Reinelt | F15B 13/0405 137/596.16 |
| 2007/0006491 A1* | 1/2007 | Ioku | E02F 3/432 37/348 |
| 2010/0043891 A1* | 2/2010 | Wilke | F16K 27/003 137/484.2 |
| 2011/0297251 A1* | 12/2011 | Huang | F15B 13/0835 137/485 |
| 2012/0006436 A1* | 1/2012 | Morimoto | F16K 11/085 137/625 |
| 2012/0024406 A1* | 2/2012 | Huang | F15B 13/043 137/625 |
| 2014/0182711 A1* | 7/2014 | Merth | F15B 13/0814 137/351 |
| 2017/0283227 A1* | 10/2017 | Turnbull | B66F 9/07563 |
| 2018/0080282 A1* | 3/2018 | Pogatschnigg | E21C 35/24 |

FOREIGN PATENT DOCUMENTS

| | | |
|---|---|---|
| JP | H07-127665 | 5/1995 |
| JP | 2000-248582 A | 12/2000 |
| JP | 2001-355601 A | 12/2001 |
| JP | 2011112123 A * | 6/2011 |
| JP | 5441452 | 12/2017 |
| WO | WO 2013/171979 A1 | 11/2013 |

* cited by examiner

METHOD FOR FORMING HYDRAULIC ACTUATOR HYDRAULIC OIL PASSAGE

TECHNICAL FIELD

The present invention relates to a method for forming hydraulic oil passages for hydraulic actuators applicable to work vehicles such as tractors.

BACKGROUND ART

Work vehicles such as tractors appropriately select and use various hydraulic actuators operating as traveling-system transfer devices and operating-system transfer devices.

That is, for work vehicles such as tractors, there are a plurality of specifications using different combinations of hydraulic actuators to be mounted.

Specifically, there are various specifications including: a specification including a multiplate friction-type hydraulic traveling clutch device operating as a traveling-system transfer device (see PTL 1 below; hereinafter referred to as a first prior art); a specification including a multiplate friction-type hydraulic forward/reverse-movement switching device operating as a traveling-system transfer device (see PTL 2 below; hereinafter referred to as a second prior art); and a specification including a multiplate friction-type hydraulic forward/reverse-movement switching device and a multiplate friction-type hydraulic two-wheel drive/four-wheel drive switching device (see PTL 3 below; hereinafter referred to as a third prior art).

Typically, valves for controlling actuation of a hydraulic actuator mounted in the work vehicle are collected in a valve block, and the valve block is mounted on a valve mount surface disposed on the outer surface of a housing such as a transmission case in the work vehicle.

In a conventional configuration, a dedicated valve block is prepared for each combination of the hydraulic actuators, and the valve mount surface formed on the outer surface of the housing is designed to be compatible with the arrangement, shape, and size, for example, of the dedicated valve block.

That is, in the work vehicle of the first prior art, a valve block dedicated to the first prior art is prepared, and a dedicated valve mount surface compatible with the valve block dedicated to the first prior art is formed on the outer surface of the housing.

Similarly, in the work vehicle of the second prior art, a valve block dedicated to the second prior art is prepared, and a dedicated valve mount surface compatible with the valve block dedicated to the second prior art is formed on the outer surface of the housing. In the work vehicle of the third prior art, a valve block dedicated to the third prior art is prepared, and a dedicated valve mount surface compatible with the valve block dedicated to the third prior art is formed on the outer surface of the housing.

CITATION LIST

Patent Literature

PTL 1: Japanese Patent Application Laid-Open No. H07-127665
PTL 2: Japanese Examined Utility Model Publication No. H06-042127
PTL 3: Japanese Patent No. 5441452

SUMMARY OF INVENTION

An aspect of the present invention has an object of providing, for various types of work vehicles in which different combinations of hydraulic actuators are mounted, a method for forming hydraulic oil passages for hydraulic actuators enabling maximum sharing of a housing on which a valve block housing valves for controlling actuation of the hydraulic actuators is mounted.

To achieve the object, an aspect of the present invention provides a method for forming hydraulic oil passages for hydraulic actuators, and the method includes: classifying various hydraulic actuators mountable in a work vehicle into a main function group for performing a main function of the work vehicle and an additional function group for performing an additional function; forming a valve block mount surface including first and second regions on an outer surface of a housing, the housing being a component of the work vehicle; collecting valves for one or more hydraulic actuators that are actually mounted depending on a specification and belong to the main function group to a main function valve block, the main function valve block being mountable directly or indirectly on the first region, and in a case where the one or more hydraulic actuators actually mounted depending on the specification include at least one hydraulic actuator belonging to the additional function group, collecting a valve for the hydraulic actuator belonging to the additional function group to an additional function valve block, the additional function valve block being mountable directly or indirectly on the second region; and mounting each of the valve blocks on a corresponding one of the regions of the valve block mount surface, and thereby, the one or more hydraulic actuators that are actually mounted are fluidly connected to each other so that the one or more hydraulic actuators are operable by using hydraulic oil from a common oil source.

The method for forming hydraulic oil passages for hydraulic actuators according to the aspect of the present invention can share the housing as much as possible in a plurality of types of work vehicles using different hydraulic actuators.

In this aspect, a hydraulic actuator for changing a drive state of a drive wheel in the work vehicle may be classified into the main function group.

The hydraulic actuator for changing the drive state of the drive wheel in the work vehicle can be exemplified by a hydraulic stepless transmission device that steplessly shifts a drive speed of the drive wheel in the work vehicle, a hydraulic forward/reverse-movement switching device that switches a drive direction of the drive wheel, and/or a hydraulic traveling clutch device that engages or disengages driving of the drive wheel.

For example, a hydraulic brake device that exerts a braking force on a drive wheel in the work vehicle can be classified into the additional function group.

Instead of, or in addition to, this configuration, a hydraulic two-wheel drive/four-wheel drive switching device that performs switching between a two-wheel state where either front wheels or rear wheels in the work vehicle are driven and a four-wheel state where both of the front wheels and the rear wheels are driven can be classified into the additional function group.

In a case where a hydraulic actuator belonging to the additional function group is not mounted in the work vehicle, the second region can be a closed surface where no ports are provided.

In the various configurations described above, the main function valve block can include a reception port fluidly connected to the common oil source, a relay port to the hydraulic actuator, and a removal port from which at least a part of hydraulic oil that has flowed into the reception port is taken out.

In a case where the work vehicle includes a hydraulic PTO clutch device that engages and disengages power transfer from a drive source to a PTO shaft and a PTO change-over valve that controls supply and exhaust of hydraulic oil to and from the hydraulic PTO clutch device, the hydraulic oil taken out from the removal port is preferably supplied to the hydraulic PTO clutch device through the PTO change-over valve.

Preferably, the additional function valve block includes an additional function reception port that is open at a mount surface to be joined to the second region, the removal port of the main function valve block includes a mount surface removal port that is open at a mount surface to be mounted on the first region, and the housing includes a communication oil passage that fluidly connects the mount surface removal port and the additional function reception port to each other.

In the various configurations described above, the main function valve block can include a first valve block that is mounted on the first region and second valve block that is mounted on the first valve block.

In this case, the second valve block may include a mount region that is mounted on an outer end surface of the first valve block and an extension region extending outward from the mount region in a direction parallel to the valve block mount surface and covering at least a part of the additional function valve block that is mounted on the second region.

DESCRIPTION OF EMBODIMENTS

In the following, a preferred embodiment of a method for forming hydraulic oil passages for hydraulic actuators will be described with reference to the accompanying drawings.

In a plurality of types of work vehicles using different combinations of hydraulic actuators to be mounted in conformity with specifications, a method for forming hydraulic oil passages for hydraulic actuators according to this embodiment enables maximum sharing of components of a housing such as a transmission case supporting a valve block in which valves for controlling actuation of the hydraulic actuators are collected.

In the method for forming hydraulic oil passages for hydraulic actuators according to this embodiment, hydraulic actuators selectively mounted depending on a specification are classified into a main function group for performing a main function of the work vehicles and an additional function group for performing an additional function of the hydraulic actuators.

A traveling-system hydraulic actuator for changing a drive state of drive wheels is classified into the main function group.

Specifically, the main function group includes a hydraulic stepless transmission device for steplessly shifting a drive speed of the drive wheels, a hydraulic forward/reverse-movement switching device for switching a drive direction of the drive wheels between forward and reverse directions, and/or a hydraulic traveling clutch device for switching the drive wheels between engagement and disengagement.

A traveling-system hydraulic actuator not classified into the main function group is classified into the additional function group.

Specifically, the additional function group includes a hydraulic brake device for selectively exerting a braking force on the drive wheels, and a hydraulic two-wheel drive/four-wheel drive switching device for switching a drive state between a two-wheel drive state in which only main drive wheels are driven and a four-wheel drive state in which auxiliary drive wheels as well as the main drive wheels are driven.

Here, a specific example of a plurality of types of work vehicles using different combinations of the hydraulic actuators will be described.

Figure 1:
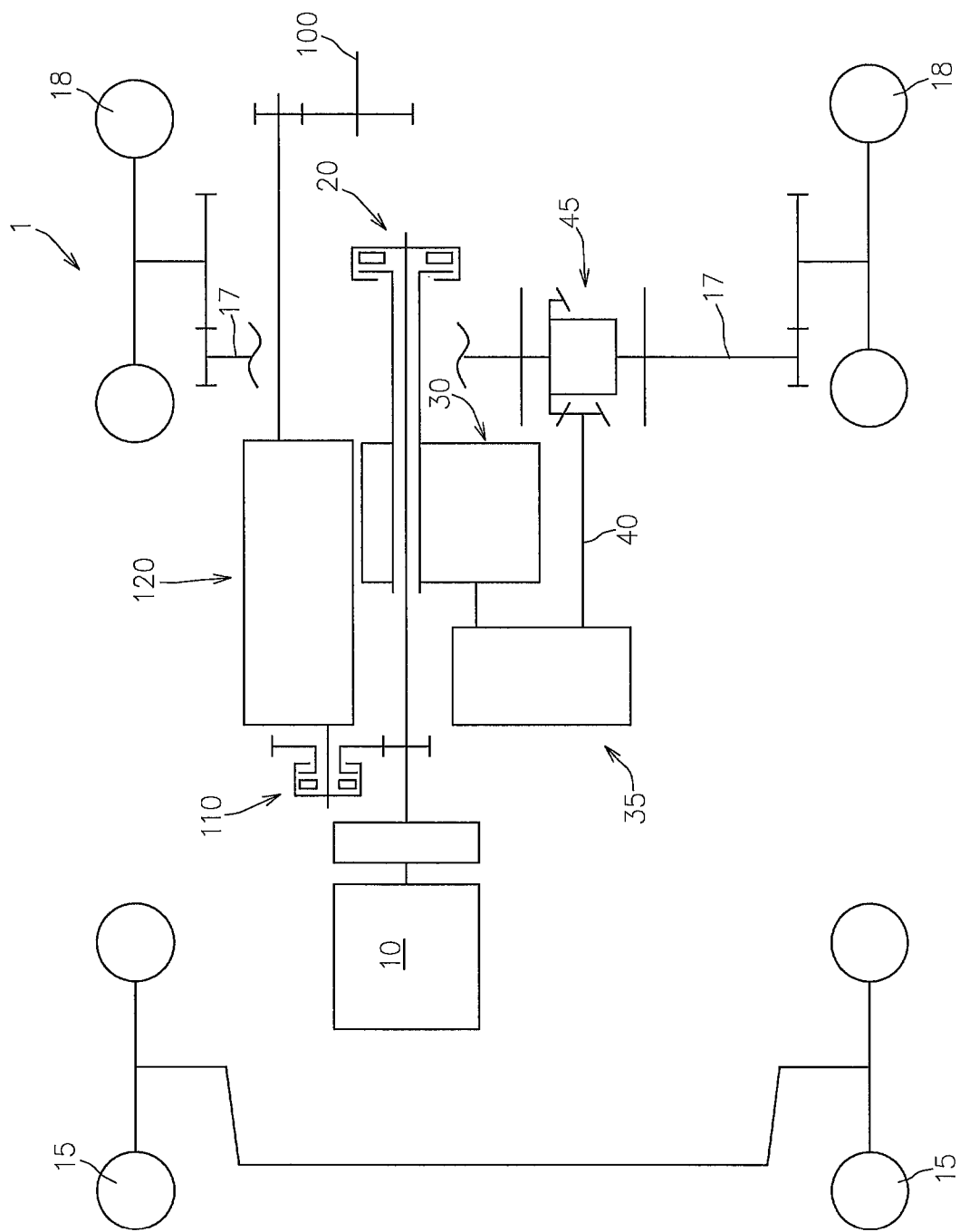
FIG. 1 is a transfer schematic view of a work vehicle of a first example on which a combination of hydraulic actuators for a first specification is mounted.
Figure 2:
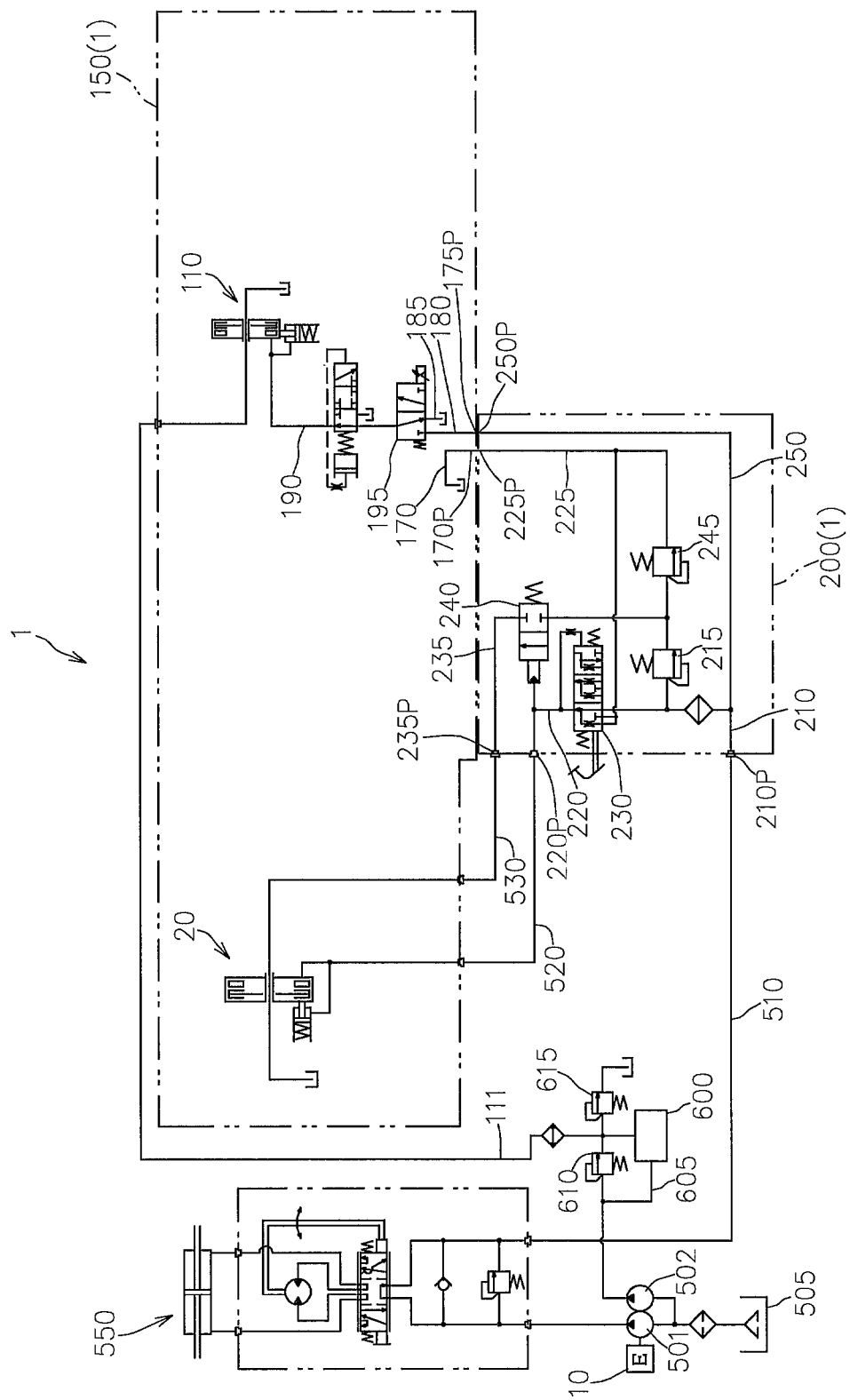
FIG. 2 is a hydraulic circuit diagram of the work vehicle of the first example.

FIGS. 1 and 2 are a transfer schematic view and a hydraulic circuit diagram, respectively, of a work vehicle 1 of the first example.

Figure 3:
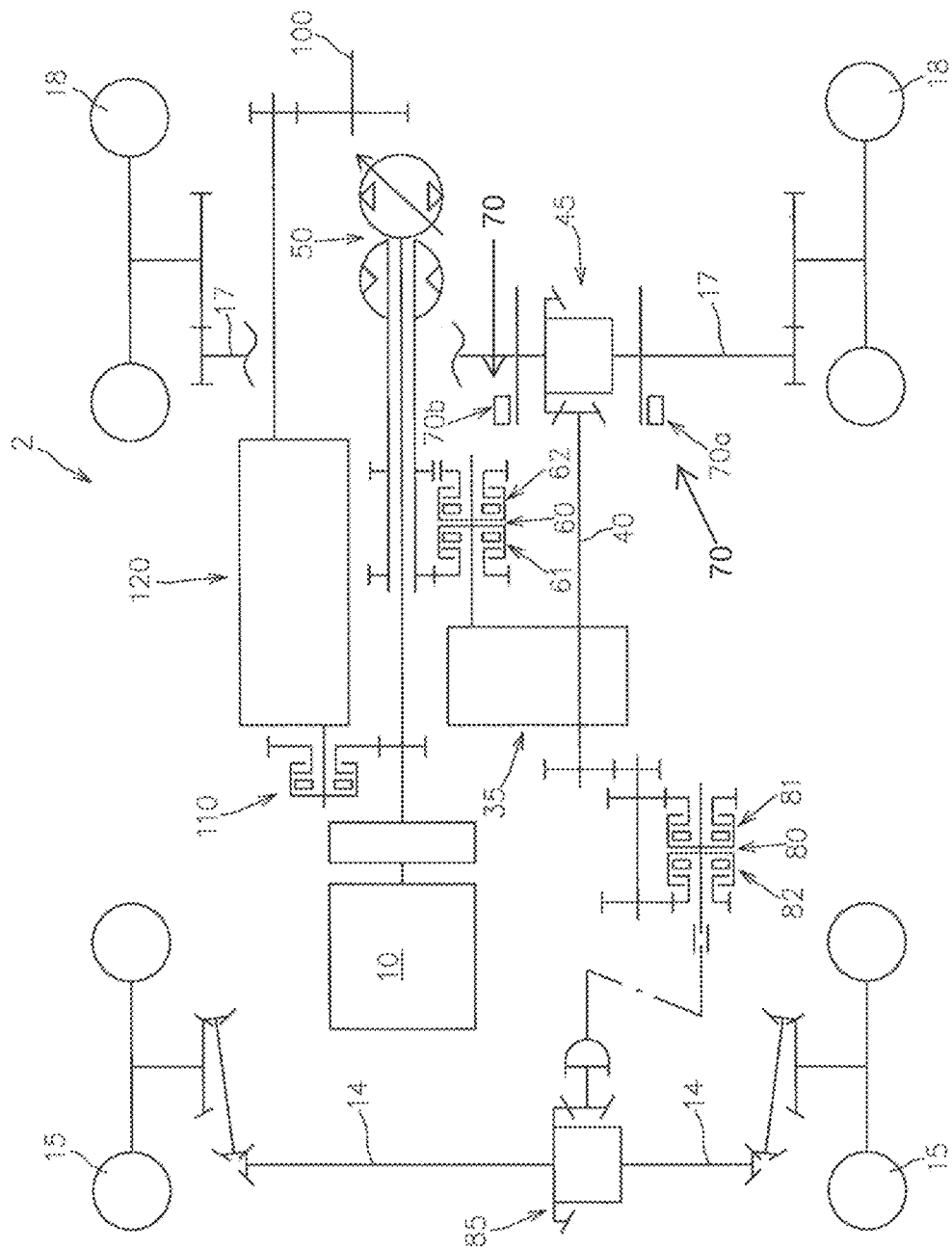
FIG. 3 is a transfer schematic view of a work vehicle of a second example on which a combination of hydraulic actuators conforming to a second specification is mounted.
Figure 4:
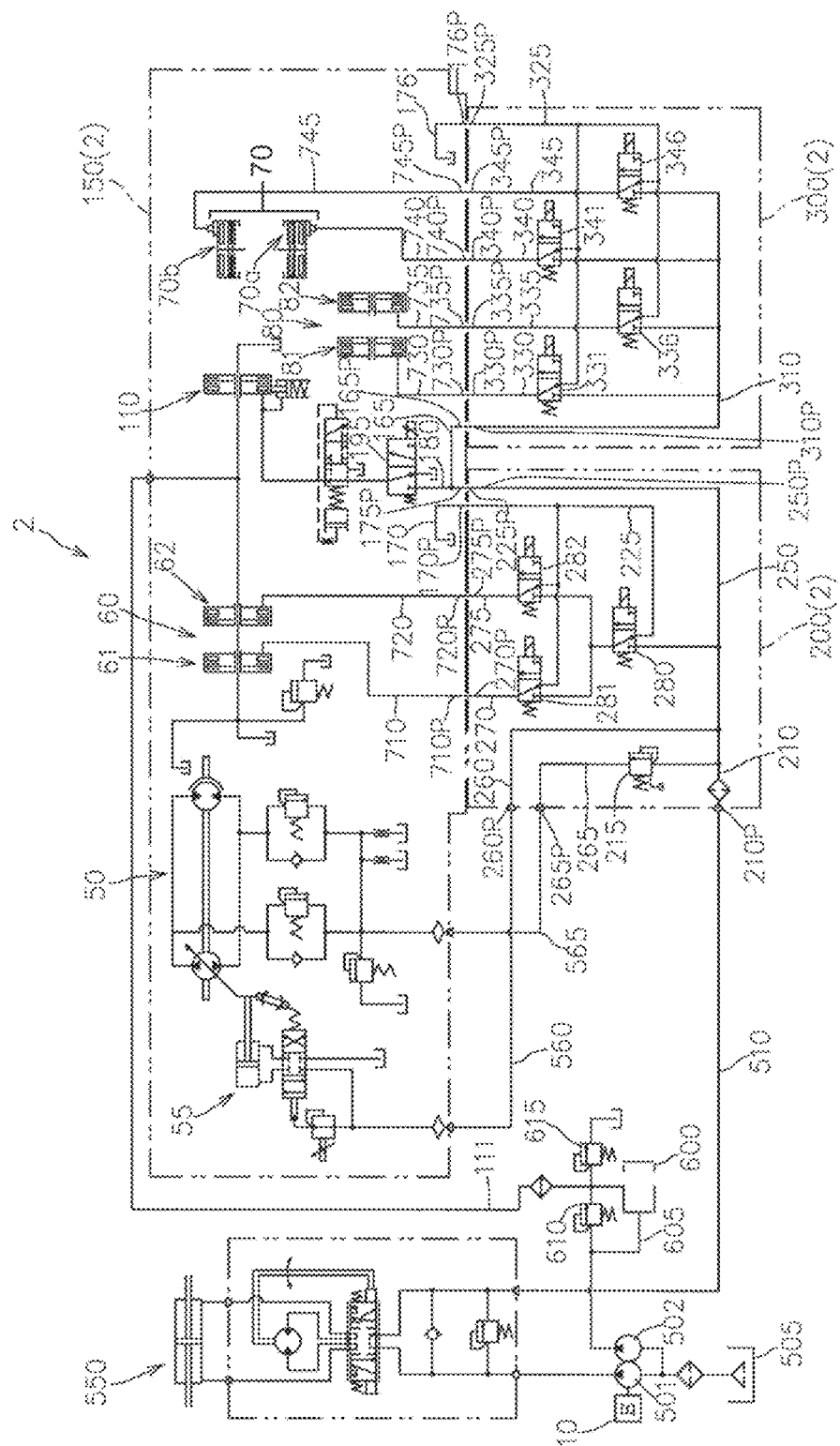
FIG. 4 is a hydraulic circuit diagram of the work vehicle of the second example.

FIGS. 3 and 4 are a transfer schematic view and a hydraulic circuit diagram, respectively, of a work vehicle 2 of the second example.

Figure 5:
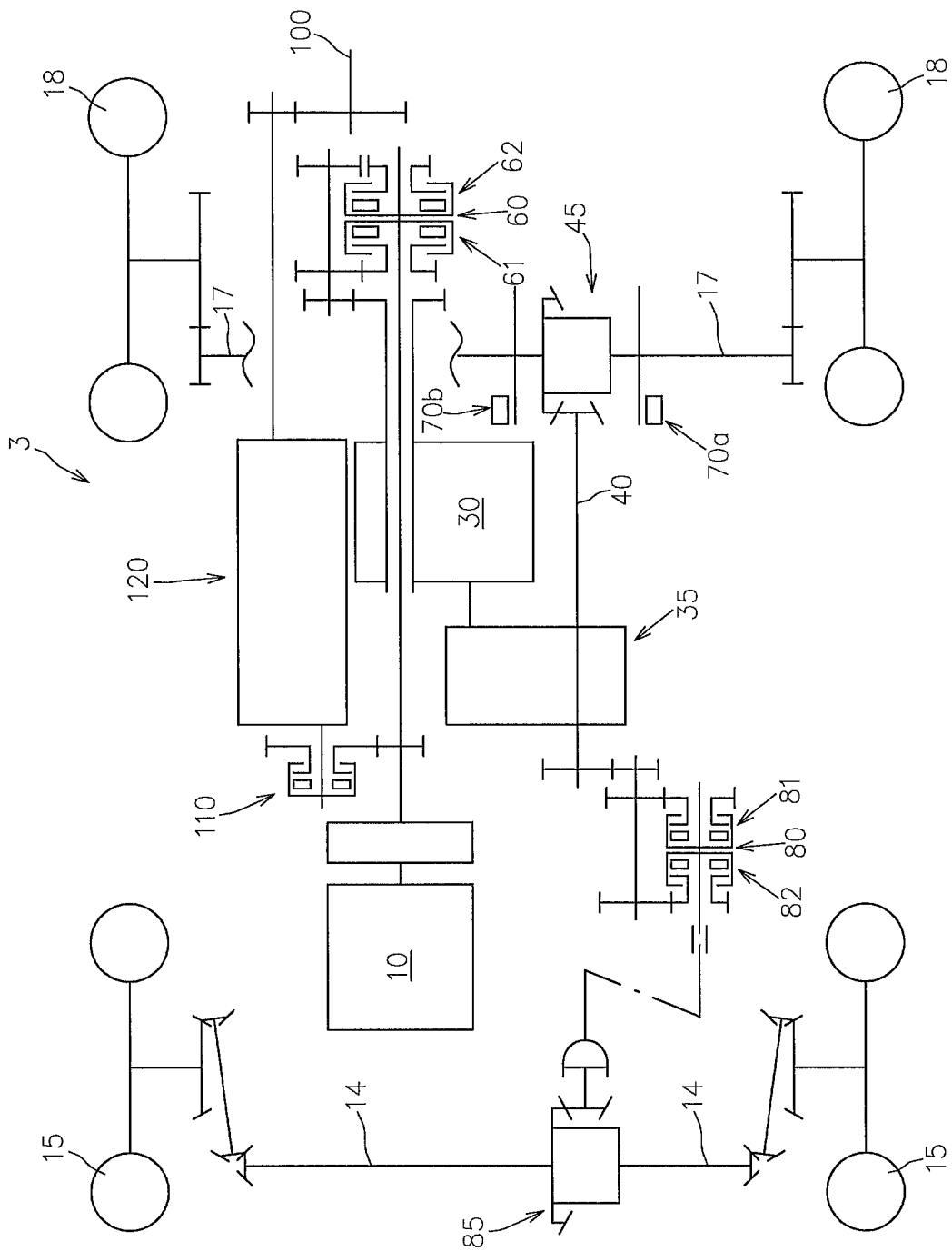
FIG. 5 is a transfer schematic view of a work vehicle of a third example on which a combination of hydraulic actuators conforming to a third specification is mounted.
Figure 6:
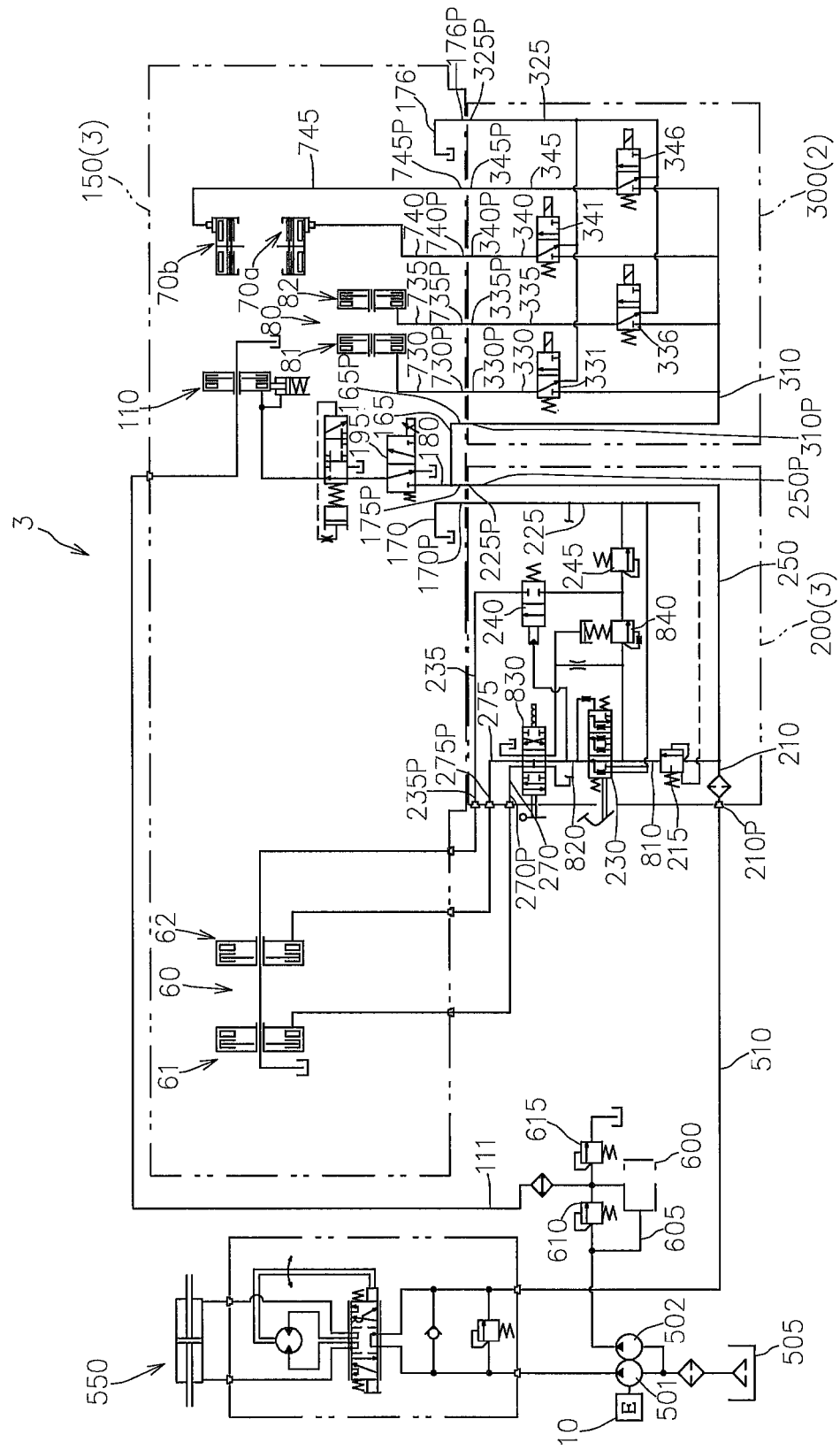
FIG. 6 is a hydraulic circuit diagram of the work vehicle of the third example.

FIGS. 5 and 6 are a transfer schematic view and a hydraulic circuit diagram, respectively, of a work vehicle 3 of the third example.

In the drawings, same reference numerals denote same or like members.

As illustrated in FIGS. 1 and 2, the work vehicle 1 of the first example includes: a drive source 10 such as an engine; a pair of left and right front wheels 15; a pair of left and right rear wheels 18; the hydraulic traveling clutch device 20 inserted in a travel transfer path from the drive source 10 to drive wheels (rear wheels 18 in the illustrated example); a mechanical main transmission device 30; a mechanical auxiliary transmission device 35; a traveling-system output shaft 40 that operatively receives a rotative force from the mechanical auxiliary transmission device 35; a pair of left and right rear axles 17 that operatively transfers a rotative force to the pair of rear wheels 18; and a rear wheel-side differential device 45 that performs differential transfer of the rotative force operatively received from the traveling-system output shaft 40 to the pair of rear axles 17.

That is, the work vehicle 1 of the first example includes the hydraulic traveling clutch device 20 as a hydraulic actuator belonging to the main function group, while conforming to a specification that does not include any hydraulic actuator belonging to the additional function group (hereinafter referred to as a first specification).

In the first example, the mechanical main transmission device 30 is assumed to include a reverse direction (rearward) gear-shift stage in addition to a normal direction (forward) gear-shift stage.

As illustrated in FIGS. 1 and 2, the work vehicle 1 of the first example further includes a PTO shaft 100 for outputting a rotative force to the outside, a hydraulic PTO clutch device 110 inserted in a PTO transfer path extending from the drive source 10 to the PTO shaft 100, and a PTO transmission device 120 inserted in the PTO transfer path.

As illustrated in FIGS. 3 and 4, the work vehicle 2 of the second example includes: the drive source 10; the pair of front wheels 15, the pair of rear wheels 18, a hydraulic stepless transmission device 50, a hydraulic forward/reverse-movement switching device 60, and the mechanical auxiliary transmission device 35 inserted in the main drive wheel transfer path; the traveling-system output shaft 40 that operatively receives a rotative force from the mechanical auxiliary transmission device 35; the pair of left and right rear axles 17; the rear wheel-side differential device 45; a hydraulic brake device 70 that can selectively exert a braking force to each of the pair of rear axles 17; a hydraulic two-wheel drive/four-wheel drive switching device 80 inserted in an auxiliary drive wheel transfer path; a pair of left and right front axles 14 that operatively transfers a rotative force to the pair of front wheels 15; and a front wheel-side differential device 85 that performs differential transfer of a rotative force operatively received from the hydraulic two-wheel drive/four-wheel drive switching device 80 to the pair of front axles.

That is, the work vehicle 2 of the second example includes the hydraulic stepless transmission device 80 and the hydraulic forward/reverse-movement switching device 60 as hydraulic actuators belonging to the main function group, and includes the hydraulic brake device 70 and the hydraulic two-wheel drive/four-wheel drive switching device 80 as hydraulic actuators belonging to the additional function group (hereinafter referred to as a second specification).

In the second example, since the hydraulic forward/reverse-movement switching device 60 that can switch the power transfer direction between normal and reverse is inserted in the main drive wheel transfer path as described above, the hydraulic stepless transmission device 50 is configured to perform stepless gear-shift only at one side in the rotation direction.

The hydraulic forward/reverse-movement switching device 60 includes a forward hydraulic clutch 61 that is in an engaged state in vehicle forward movement and a reverse hydraulic clutch 62 that is in an engaged state in vehicle reverse-movement.

The hydraulic two-wheel drive/four-wheel drive switching device 80 is configured to selectively establish a two-wheel state in which only main drive wheels (the rear wheels 18 in the second example) are driven, a normal four-wheel state in which auxiliary drive wheels (the front wheels 15 in the second example) are driven at the same speed as the main drive wheels, and an acceleration four-wheel state in which the auxiliary drive wheels are driven at higher speed than the main drive wheels.

More specifically, as illustrated in FIGS. 3 and 4, the hydraulic two-wheel drive/four-wheel drive switching device 80 includes a normal four-wheel hydraulic clutch 81 and an acceleration four-wheel hydraulic clutch 82.

The hydraulic brake device 70 includes a first hydraulic brake 70a that can exert a braking force on one of the pair of rear axles 17 and a second hydraulic brake 70b that can exert a braking force on the other one of the pair of rear axles 17.

As illustrated in FIGS. 3 and 4, the work vehicle of the second example also includes the PTO shaft 100, the hydraulic PTO clutch device 110, and the PTO transmission device 120.

As illustrated in FIGS. 5 and 6, the work vehicle 3 of the third example includes: the drive source 10; the pair of front wheels 15; the pair of rear wheels 18; the hydraulic forward/reverse-movement switching device 60, the mechanical main transmission device 30, and the mechanical auxiliary transmission device 35 that are inserted in the main drive wheel transfer path extending from the drive source 10 to the main drive wheels (the pair of rear wheels 18 in the illustrated example); the traveling-system output shaft 40 that operatively receives a rotative force from the mechanical auxiliary transmission device 35; the pair of left and right rear axles 17; the rear wheel-side differential device 45, the hydraulic brake device 70 that can selectively exert a braking force on each of the pair of rear axles 17; the hydraulic two-wheel drive/four-wheel drive switching device 80 inserted in the auxiliary drive wheel transfer path extending from the traveling-system output shaft 40 to the auxiliary drive wheels (the pair of front wheels 15 in the illustrated example); the pair of left and right front axles 14 that operatively transfers a rotative force to the pair of front wheels 15; and the front wheel-side differential device 85.

That is, the work vehicle 3 of the third example includes the hydraulic forward/reverse-movement switching device 60 as a hydraulic actuator belonging to the main function group, and includes the hydraulic brake device 70 and the hydraulic two-wheel drive/four-wheel drive switching device 80 as hydraulic actuators belonging to the additional function group (hereinafter referred to as a third specification).

In the third example, since the hydraulic forward/reverse-movement switching device 60 capable of switching the power transfer direction between normal and reverse is inserted in the main drive wheel transfer path as described above, the mechanical main transmission device 30 includes a gear-shift stage only at one side in the rotation direction.

As illustrated in FIGS. 5 and 6, the work vehicle 3 of the third example also includes the PTO shaft 100, the hydraulic PTO clutch device 110, and the PTO transmission device 120.

The method for forming hydraulic oil passages for hydraulic actuators according to this embodiment has a configuration described later so as to enable maximum sharing of components of a housing such as a transmission case among the work vehicles 1 through 3 of the first through third examples using different combinations of hydraulic actuators to be mounted.

Figure 7:
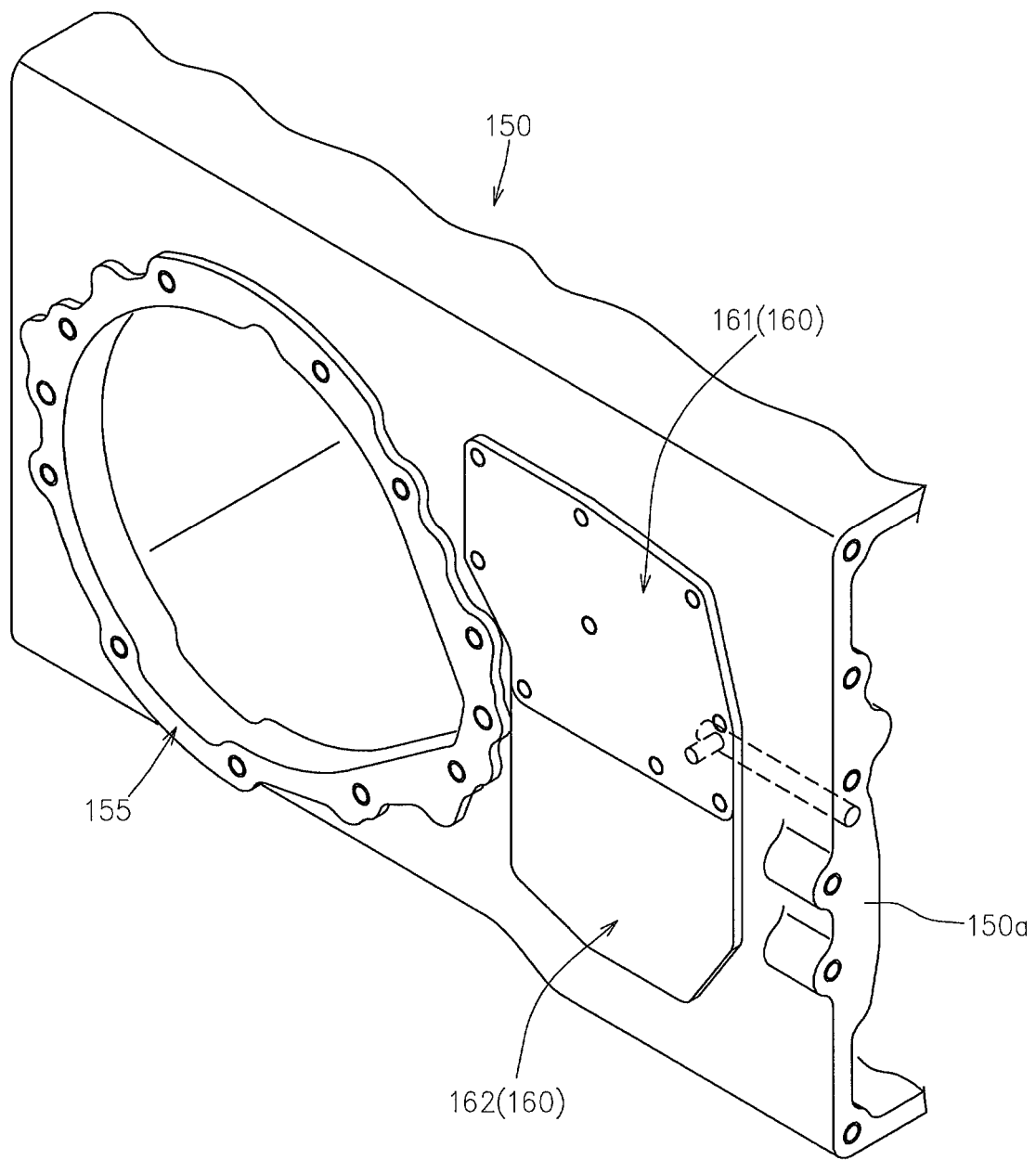
FIG. 7 is a partial perspective view of a transmission case that can be shared by the work vehicles of the first through third examples and serves as a housing on which a valve block housing valves for the hydraulic actuators is mounted.

FIG. 7 is a partial perspective view of a rear housing 150 used as a housing that can be shared by the work vehicles 1 through 3 of the first through third examples.

The rear housing 150 houses the differential device 45 and supports the PTO shaft 100, and depending on the specifications described above, incorporates a corresponding one or more of the hydraulic traveling clutch device 20, the hydraulic stepless transmission device 50, and the hydraulic forward/reverse-movement switching device 60.

A front housing (not shown) continuous to a front end surface 150a of the rear housing 150 houses the hydraulic PTO clutch device 110, the PTO transmission device 120, and the mechanical auxiliary transmission device 35, and depending on the specifications described above, incorporates a corresponding one or more of the mechanical main transmission device 30 and the hydraulic forward/reverse-movement switching device 60, and the hydraulic two-wheel drive/four-wheel drive switching device 80.

As illustrated in FIG. 7, the rear housing 150 has a valve mount surface 160 including a first region 161 and a second region 162.

In the example illustrated in FIG. 7, a part of the transmission case included in the work vehicles 1 through 3 serves as the rear housing 150, and the valve mount surface 160 is disposed on a side surface of the transmission case adjacent to an axle case coupling surface 155.

In fabricating the rear housing 150, the outer surface of the first region 161 serving as a valve mount surface is subjected to machining, and only in the case of providing the function as the valve mount surface depending on the specification, a process of machining is added for the outer surface of the second region 161.

The work vehicles 1 through 3 of the first through third examples are common in using the rear housing 150 having the valve mount surface 160 including the first and second regions 161 and 162, whereas regarding a specific oil passage structure formed in peripheral walls of the valve mount surface 160 and the rear housing 150, a housing-side reception port 175P described later and a PTO supply oil passage 180 described later fluidly connected to the housing-side reception port 175P are shared, and the other part of the structure differs depending on the specification.

A valve block housing valves responsible for actuation control of hydraulic actuators belonging to the main function group (hereinafter referred to as a main function valve block) is mounted on the first region 161.

Specifically, the type of valves housed in the main function valve block and the oil passage formed in the main function valve block differ among the specifications of the work vehicles, and the port provided in the first region and the oil passage formed in the peripheral wall of the rear housing also differ among the specifications of the work vehicles.

In the case of mounting hydraulic actuators belonging to the additional function group, a valve block that houses valves responsible for actuation control of hydraulic actuators to be mounted belonging to the additional function group (hereinafter referred to as an additional function valve block) is mounted on the second region 162.

Specifically, the type of valves housed in the additional function valve block and the oil passage formed in the additional function valve block differ among the specifications of the work vehicles, and the port provided in the second region and the oil passage formed in the peripheral wall of the rear housing also differ among the specifications of the work vehicles.

In the case of not mounting the hydraulic actuators belonging to the additional function group, the second region 162 of the valve mount surface 160 is a closed surface where no ports are provided (in the state illustrated in FIG. 7).

Here, detailed structures of the main function valve block and the additional function valve block used in the work vehicles 1 through 3 of the first through third examples.

First, a valve block used in the work vehicle 1 of the first example will be described.

Figure 8:
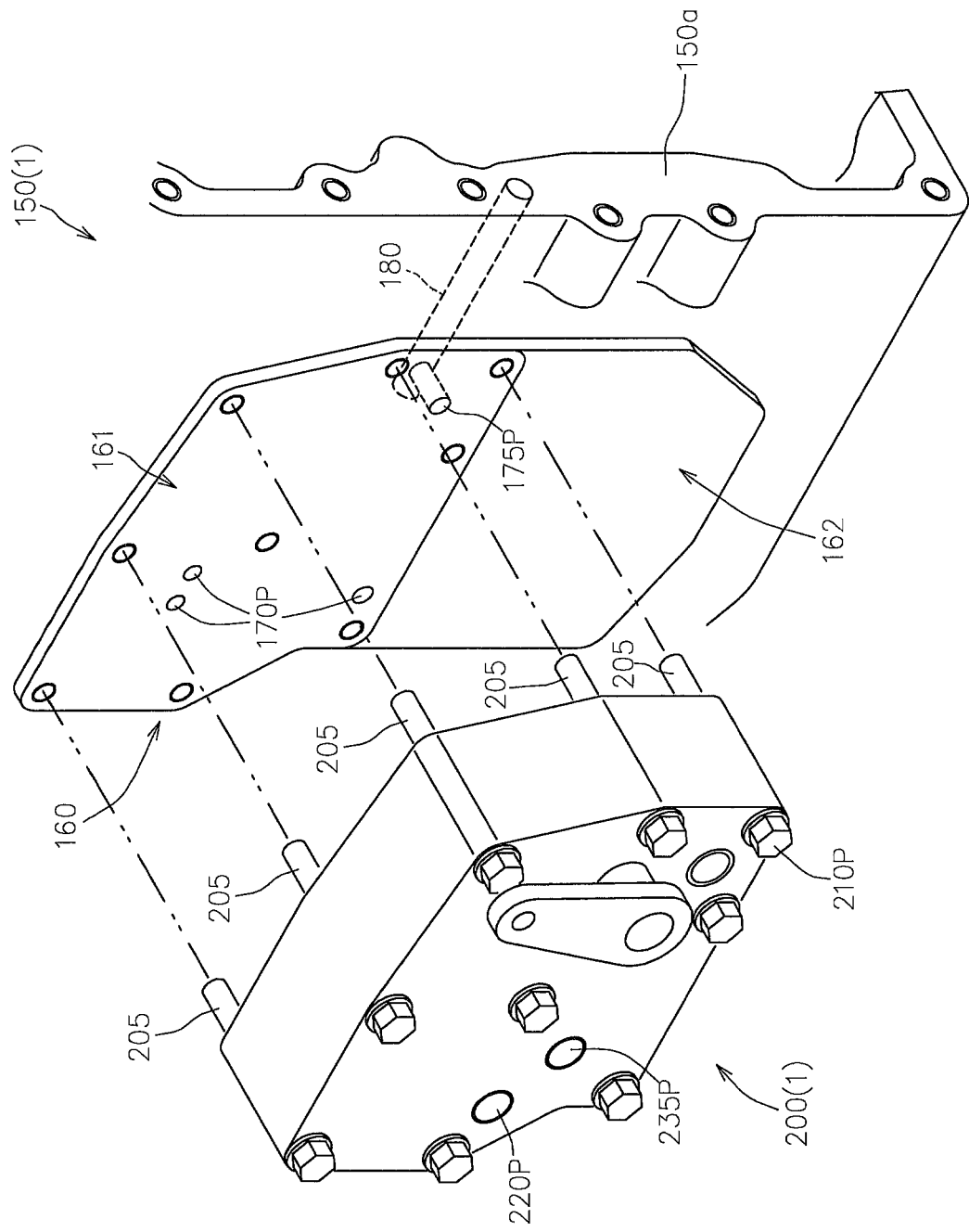
FIG. 8 is a disassembled perspective view of a housing and a main function valve block in the work vehicle of the first example.

FIG. 8 is a disassembled perspective view of a rear housing 150(1) and a main function valve block 200(1) in the work vehicle 1 of the first example.

Figure 9:
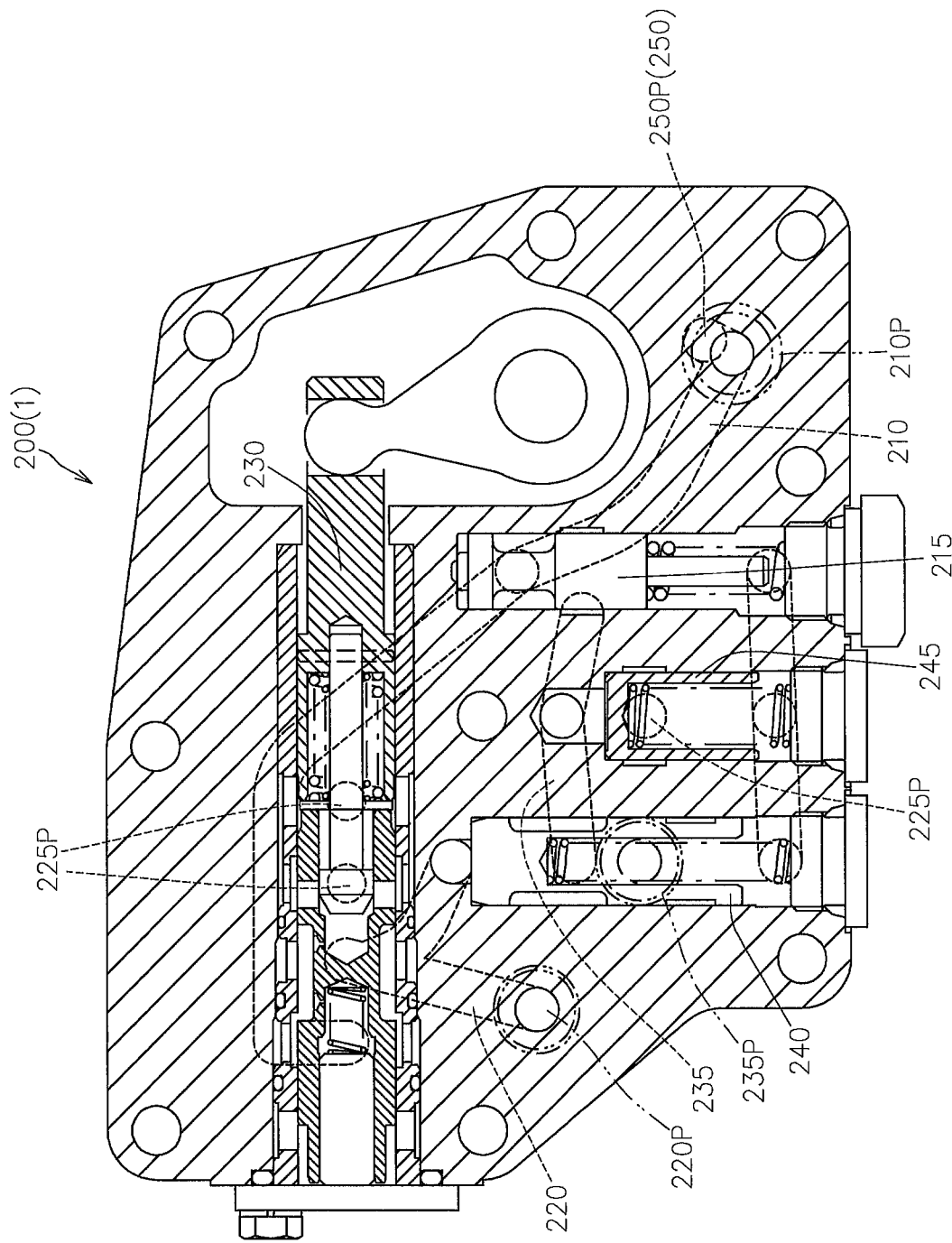
FIG. 9 is a cross-sectional view of the main function valve block in the work vehicle of the first example.

FIG. 9 is a cross-sectional view of a main function valve block 200(1) in the work vehicle 1 of the first example.

As described above, the work vehicle 1 of the first example the conforms to the first specification including the hydraulic traveling clutch device 20 as a hydraulic actuator belonging to the main function group and not including any hydraulic actuator belonging to the additional function group (see FIGS. 1 and 2).

Thus, the work vehicle 1 of the first example includes the main function valve block 200(1) but does not include the additional function valve block.

The main function valve block 200(1) is detachably attached to the first region 161 with a fastening member 205 such as a bolt.

As illustrated in FIGS. 2, 8, and 9, the main function valve block 200(1) used in the first specification includes: a main oil passage 210 whose one end is open at the outer surface to form a reception port 210P that receives hydraulic oil from an oil source; a main relief valve 215 that sets a hydraulic pressure of the main oil passage 210; a supply/exhaust oil passage 220 whose one end is open at the outer surface to form a relay port 220P to the hydraulic traveling clutch device 20; a drain oil passage 225 whose one end is open at the outer surface to form a drain port 225P; an inching valve 230 selectively connecting the supply/exhaust oil passage 220 to the main oil passage 210 and the drain oil passage 225; a lubricating oil passage 235 whose one end is fluidly connected to a secondary side of the main relief valve 215 and whose other end is open at the outer surface to form a lubricating oil port 235P to the hydraulic traveling clutch device 20; a lubricant supply valve 240 inserted in the lubricating oil passage 235 so as to control a lubricant flow rate depending on a hydraulic pressure of the supply/exhaust oil passage 220; and a lubricant relief valve 245 that sets a hydraulic pressure of the lubricating oil passage 235.

In this embodiment, as illustrated in FIG. 8, the reception port 210P, the relay port 220P, and the lubricating oil port 235P are open at an outer end surface of the main function valve block 200(1), whereas the drain port 225P is open at an inner end surface of the main function valve block 200(1) (a mount surface to be mounted on the first region 161).

A pipe forming a part of a main supply line 510 (see FIG. 2) for supplying hydraulic oil from the oil source is connected to the reception port 210P. A pipe forming a part of a hydraulic oil supply/exhaust line 520 (see FIG. 2) to the hydraulic traveling clutch device 20 is connected to the relay port 220P. A pipe forming a part of a lubricating oil supply line 530 (see FIG. 2) to the hydraulic traveling clutch device 20 is connected to the lubricating oil port 235P.

On the other hand, the drain port 225P is connected to an inner oil passage of the rear housing 150(1).

That is, in the rear housing 150(1), a tank oil passage 170 is formed to have one end open in the first region 161 to be fluidly connected to the drain port 225P and form a tank port 170P and the other end open in inner space of the rear housing 150(1).

As described above, the work vehicle 1 of the first example includes the hydraulic PTO clutch device 110 and is configured to supply hydraulic oil to the hydraulic PTO clutch device 110 through the main function valve block 200(1) as illustrated in FIG. 2.

That is, as illustrated in FIG. 2, the main function valve block 200(1) includes a removal oil passage 250 for taking a part of hydraulic oil that has flowed into the reception port 210P out of the main function valve block 200(1).

Specifically, as illustrated in FIGS. 2 and 9, the removal oil passage 250 has one end fluidly connected to the main oil passage 210 and the other end open at the mount surface to form a mount surface removal port 250P.

As illustrated in FIGS. 2 and 8, the rear housing 150(1) includes the housing-side reception port 175P whose one end is open at the first region 161(1) to be fluidly connected to the mount surface removal port 250P and a PTO supply oil passage 180 whose one end is fluidly connected to the housing-side reception port 175P. The other end of the PTO supply oil passage 180 is open at the front end surface 150a of the rear housing 150(1).

The unillustrated front housing coupled to the front end surface of the rear housing 150(1) includes: a PTO supply/exhaust oil passage 190 that is fluidly connected to the other end of the PTO supply oil passage 180 through the rear end surface of the front housing and the front end surface of the rear housing 150(1), which are coupled together, and that supplies and exhausts hydraulic oil to and from the hydraulic PTO clutch device 110; a PTO drain oil passage 185; and a PTO change-over valve 195 that selectively connects the PTO supply/exhaust oil passage 190 to the PTO supply oil passage 180 and the PTO drain oil passage 185.

In this embodiment, the work vehicle 1 includes hydraulic pumps serving as oil sources for various hydraulic actuators included in the work vehicle 1.

As illustrated in FIG. 2, the work vehicle 1 includes first and second hydraulic pumps 501 and 502 that are operatively driven by the drive source 10.

The first hydraulic pump 501 serves as a common oil source of a hydraulic power steering device 550 included in the work vehicle 1, a hydraulic actuator belonging to the main function group, and the hydraulic PTO clutch device 110.

Specifically, as illustrated in FIG. 2, the first hydraulic pump 501 has a suction side fluidly connected to an oil tank 505 and a discharge side fluidly connected to the hydraulic power steering device 550.

Return oil from the hydraulic power steering device 550 is supplied to the reception port 210P through the pipe forming the part of the main supply line 510.

On the other hand, the second hydraulic pump 502 serves as an oil source of a position control hydraulic actuator that controls the position of a work machine such as a front loader and a cultivator provided to the work vehicle 1.

Specifically, as illustrated in FIG. 2, the second hydraulic pump 502 has a suction side fluidly connected to the oil tank 505 and a discharge side fluidly connected to a position control hydraulic circuit 600.

Figure 10:
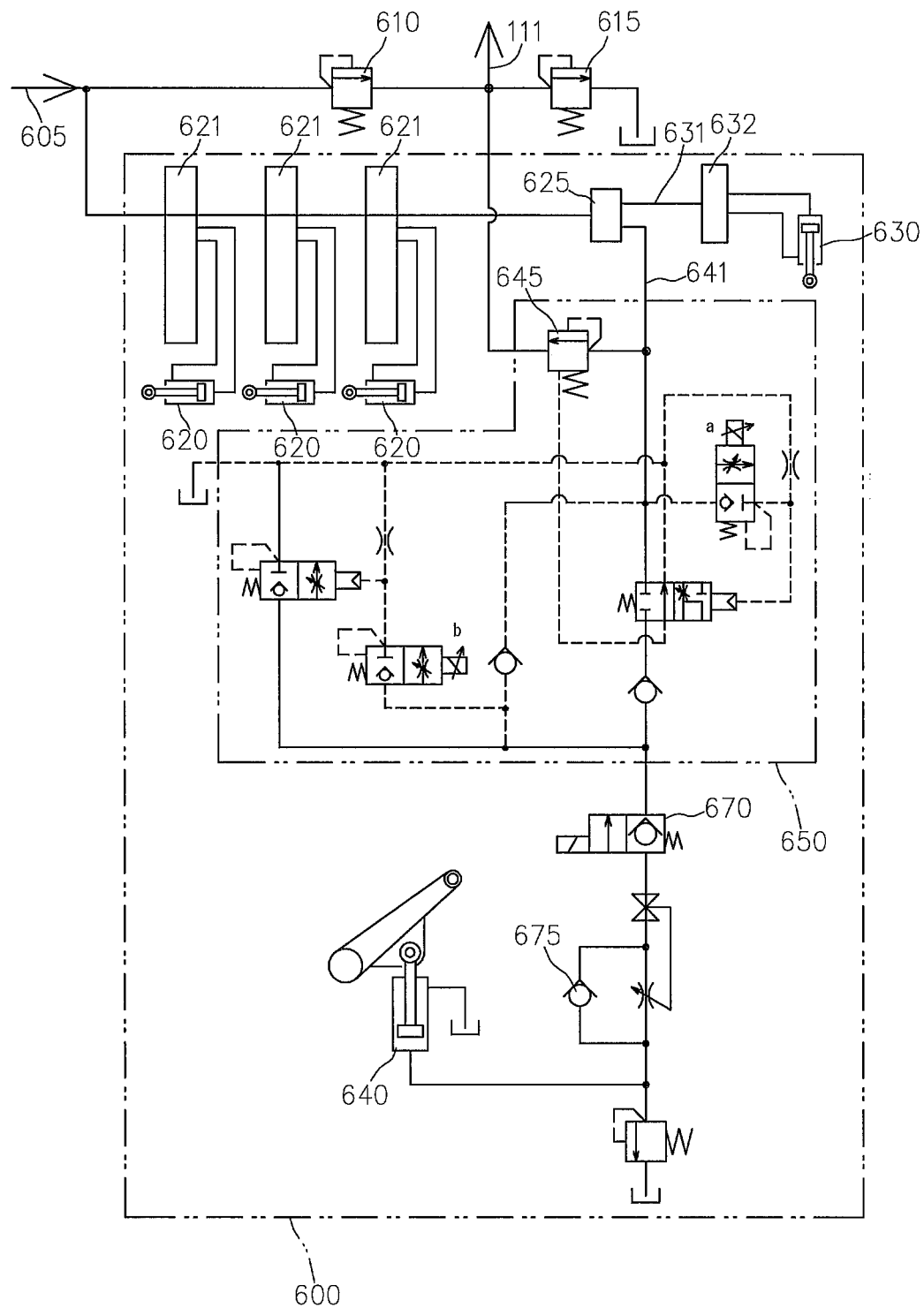
FIG. 10 is a hydraulic circuit diagram of a position controlling hydraulic actuator that can be mounted on the work vehicles of the first through third examples.

FIG. 10 is a circuit diagram of the position control hydraulic circuit 600.

As illustrated in FIGS. 2 and 10, the discharge side of the second hydraulic pump 502 is fluidly connected to a reception port 600P of the position control hydraulic circuit through a pipe forming a part of a position control main supply line 605.

As illustrated in FIGS. 2 and 10, a hydraulic pressure of the position control main supply line 605 is set by using a relief valve 610, and relief oil of the relief valve 610 is supplied as lubricating oil to the hydraulic PTO clutch device 110 through a lubricant line 111, while being adjusted in pressure with a lubricating oil relief valve 615.

The position control hydraulic circuit 600 is configured to perform supply and exhaust control of hydraulic oil to and from a front loader hydraulic cylinder 620, a horizontal control hydraulic cylinder 630 of a work machine such as a rotary provided to a rear portion of the work vehicle 1, and an elevation hydraulic cylinder 640 of the working machine.

Specifically, as illustrated in FIG. 10, the position control hydraulic circuit 600 includes: a change-over valve 621 for switching hydraulic oil to the front loader hydraulic cylinder 620 between supply and exhaust; a flow dividing valve 625 for dividing return oil from the front loader hydraulic cylinder 620 into the horizontal control hydraulic cylinder 630 and the elevation hydraulic cylinder 640; a horizontal control hydraulic pressure line 631 for receiving a part of the return oil from the front loader hydraulic cylinder 620 obtained by the division by the flow dividing valve 625; a change-over valve 632 inserted in the horizontal control hydraulic pressure line 631; an elevation control hydraulic pressure line 641 for receiving the other part of the return oil obtained by the division by the flow dividing valve 625; a solenoid elevation valve 650 inserted in the elevation control hydraulic pressure line 641; a descent preventing valve 670; a slow return valve 675; and an unloading valve 645 for releasing the pressure when the elevation control hydraulic pressure line 641 is neutral.

In this embodiment, as illustrated in FIG. 10, the descent preventing valve 670 is a solenoid valve incorporating a check valve and compatible with high flow rates to thereby simplify the configuration, as compared to a conventional descent preventing valve.

That is, the conventional descent preventing valve inserted in the elevation control hydraulic pressure line 641 includes a check valve and a pilot solenoid valve for controlling an actuation position of the check valve, and thus, an oil passage connecting these valves is needed.

On the other hand, since the descent preventing valve 670 is a solenoid valve incorporating the check valve and compatible with high flow rates, the configuration can be significantly simplified as compared to a conventional configuration. Accordingly, lower costs can be achieved.

Next, a valve block used in the work vehicle 2 of the second example will be described.

Same reference numerals denote same members in the valve block used in the work vehicle 1 of the first example.

Figure 11:
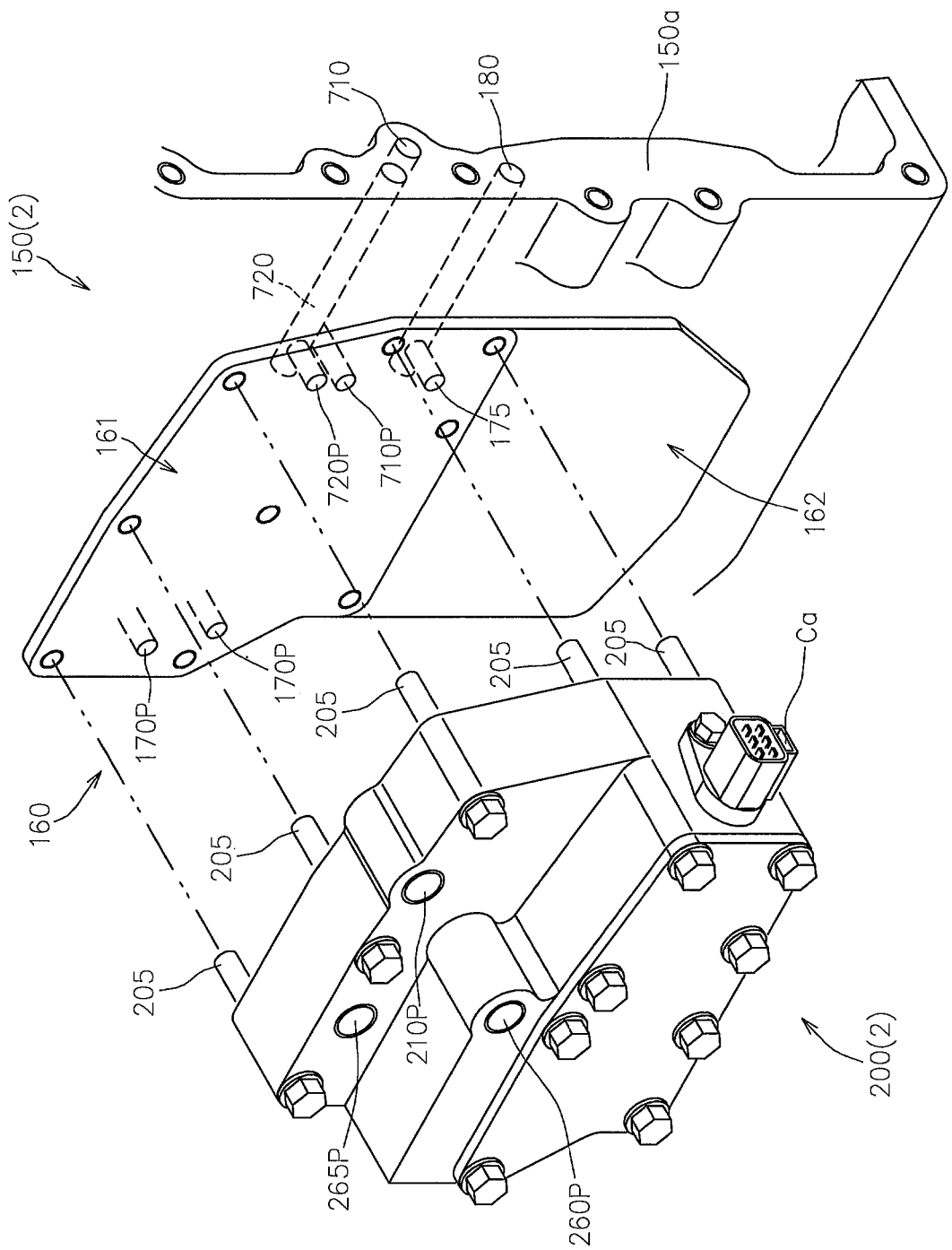
FIG. 11 is a disassembled perspective view of a housing and a main function valve block in the work vehicle of the second example.

FIG. 11 is a disassembled perspective view of a rear housing 150(2) and a main function valve block 200(2) in the work vehicle 2 of the second example.

Figure 12:
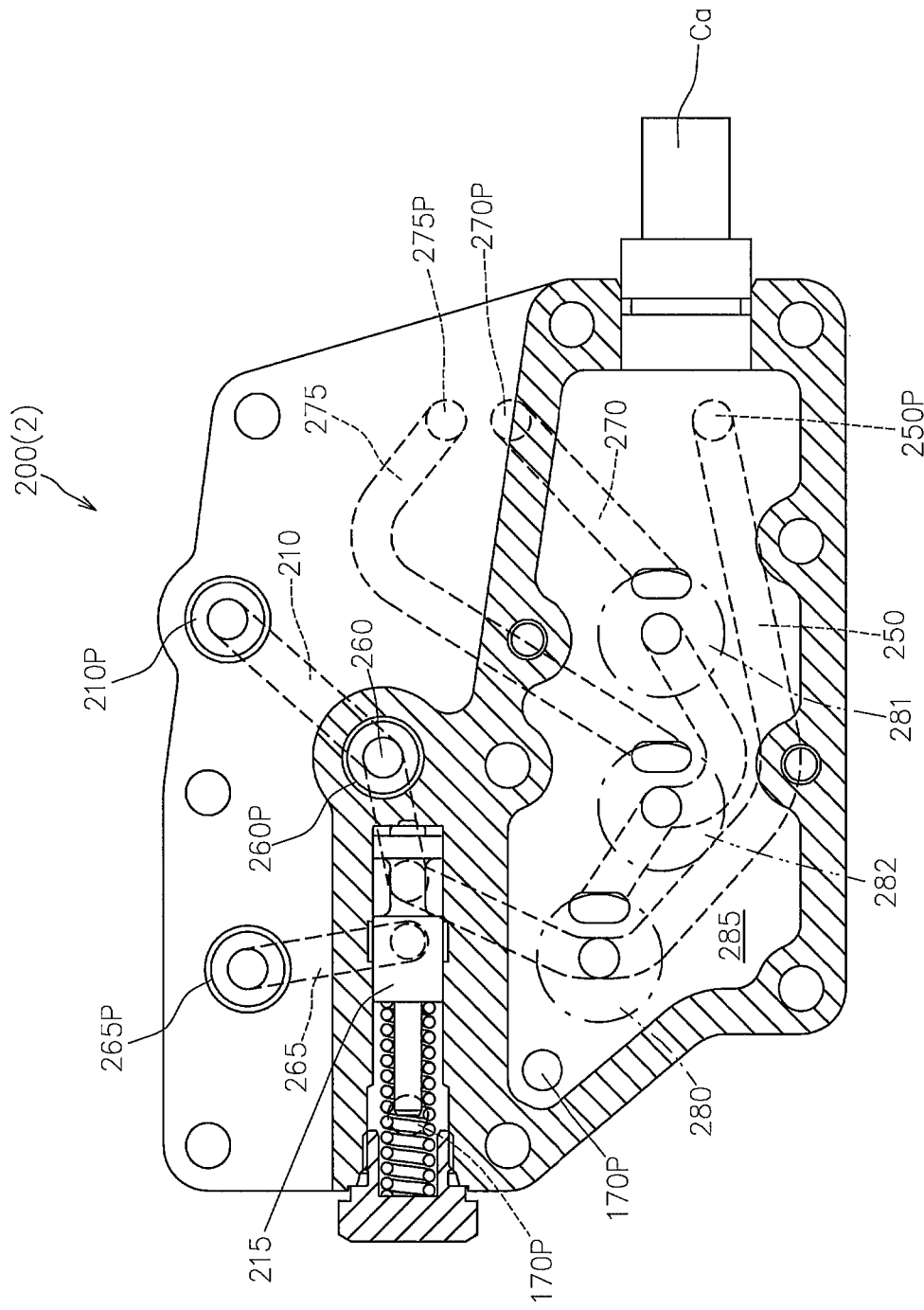
FIG. 12 is a cross-sectional view of the main function valve block in the work vehicle of the second example.

FIG. 12 is a cross-sectional view of the main function valve block 200(2).

Figure 13:
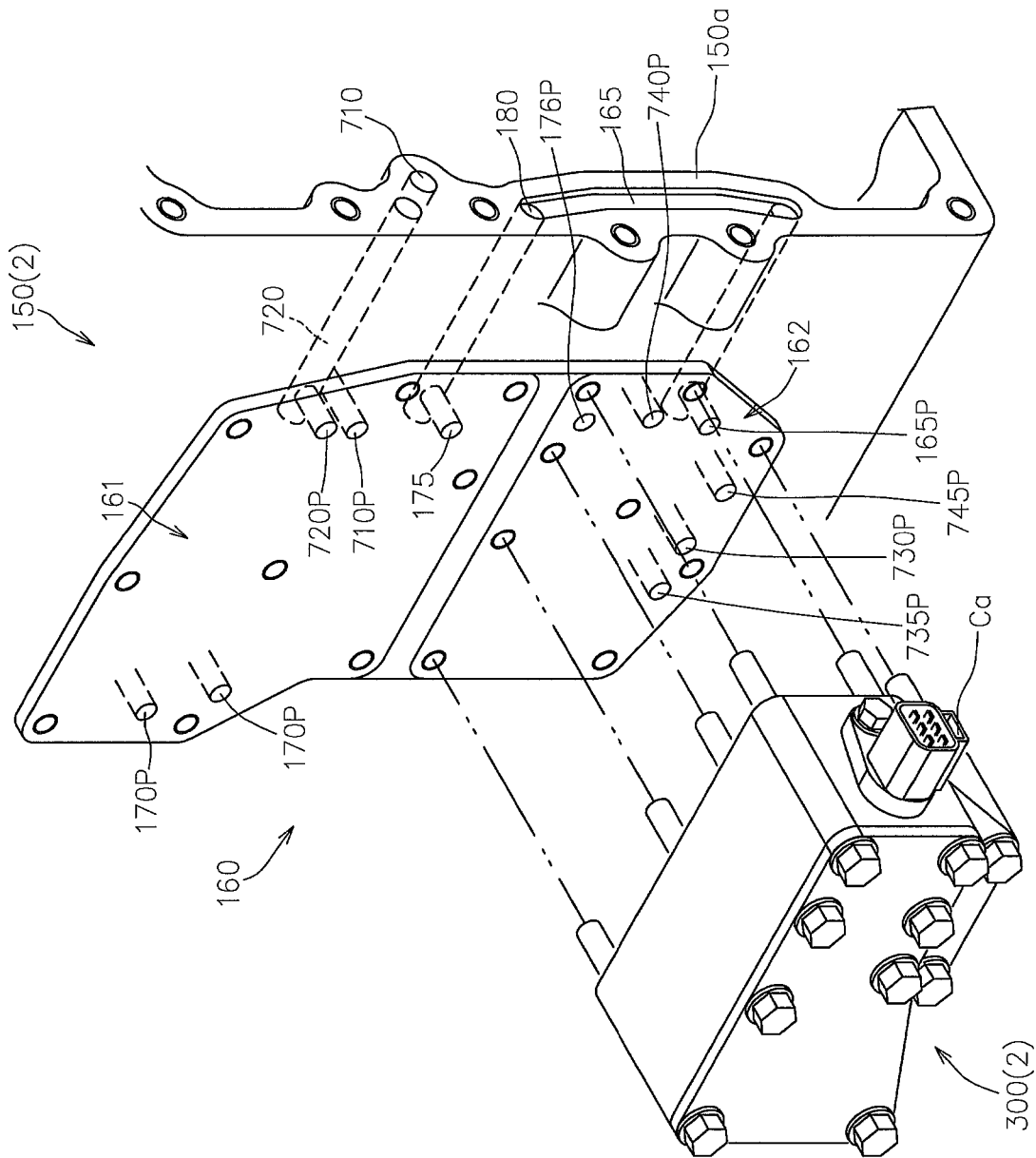
FIG. 13 is a disassembled perspective view of a housing and an additional function valve block in the work vehicle of the second example.

FIG. 13 is a disassembled perspective view of the rear housing 150(2) and an additional function valve block 300(2) in the work vehicle of the second example.

Figure 14:
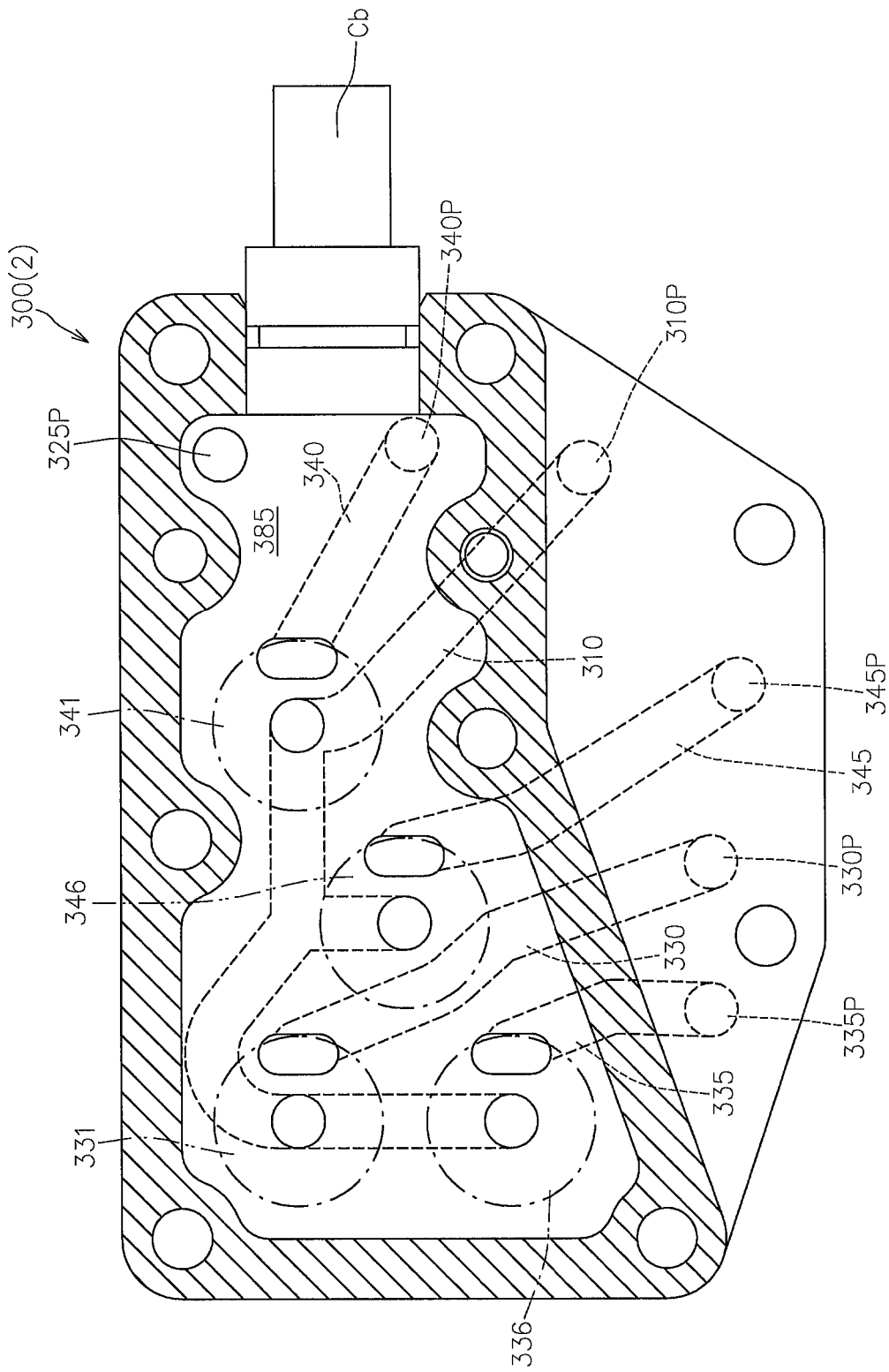
FIG. 14 is a cross-sectional view of the additional function valve block in the work vehicle of the second example.

FIG. 14 is a cross-sectional view of the additional function valve block 300(2).

As described above, the work vehicle 2 of the second example conforms to the second specification including the hydraulic stepless transmission device 50 and the hydraulic forward/reverse-movement switching device 60 as hydraulic actuators belonging to the main function group, and including the hydraulic brake device 70 and the hydraulic two-wheel drive/four-wheel drive switching device 80 as hydraulic actuators belonging to the additional function group (see FIGS. 3 and 4).

Thus, as illustrated in FIG. 2, the work vehicle 2 of the second example includes the additional function valve block 300(2) in addition to the main function valve block 200(2).

First, the main function valve block 200(2) will be described.

As illustrated in FIGS. 4, 11, and 12, the main function valve block 200(2) used in the second specification includes: the main oil passage 210 whose one end is open at the outer surface to form the reception port 210P that receives hydraulic oil from the oil source; the main relief valve 215 that sets a hydraulic pressure of the main oil passage 210; a valve block-side servo oil passage 260 whose one end is fluidly connected to the main oil passage 210 and whose other end is open at the outer surface to form a valve block-side servo relay port 260P; a valve block-side charge oil passage 265 whose one end is fluidly connected to a secondary side of the main relief valve 215 and whose other end is open at the outer surface to form a valve block-side charge relay port 265P; a drain oil passage 225 whose one end is open at the outer surface to form a drain port 225P; a valve block-side forward-movement supply/exhaust oil passage 270 whose one end is open at the outer surface to form a valve block-side forward-movement relay port 270P; a valve block-side reverse-movement supply/exhaust oil passage 275 whose one end is open at the outer surface to form a valve block-side reverse-movement relay port 275P; and solenoid valves 280, 281, and 282 that switch connection states of the valve block-side forward-movement supply/exhaust oil passage 270 and the valve block-side reverse-movement supply/exhaust oil passage 275 to the main oil passage 210 and the drain oil passage 225.

In this embodiment, as illustrated in FIG. 11, the reception port 210P, the valve block-side servo relay port 260P, and the valve block-side charge relay port 265P are open at an outer end surface of the main function valve block 200(2), whereas the valve block-side forward-movement relay port 270P, the valve block-side reverse-movement relay port 275P, and the drain port 225P are open at an inner end surface of the main function valve block 200(2) (a mount surface to be mounted on the first region 161).

As illustrated in FIG. 4, a pipe forming a part of the main supply line 510 is connected to the reception port 210P.

A pipe forming a part of the servo line 560 for supplying hydraulic oil to a hydraulic servo mechanism 55 that performs gear-shift operation of the hydraulic stepless transmission device 50 is connected to the valve block-side servo relay port 260P.

A pipe forming a part of a charge line 565 for supplementing the hydraulic stepless transmission device 50 with hydraulic oil is connected to the valve block-side charge relay port 265P.

On the other hand, the valve block-side forward-movement relay port 270P, the valve block-side reverse-movement relay port 275P, and the drain port 225P are connected to an inner oil passage of the rear housing 150(2).

That is, as illustrated in FIG. 4, the rear housing 150(2) includes a housing-side forward-movement supply/exhaust oil passage 710, a housing-side reverse-movement supply/exhaust oil passage, and the tank oil passage 170.

As illustrated in FIGS. 4 and 11, the housing-side forward-movement supply/exhaust oil passage 710 has one end open in the first region 161 to be fluidly connected to the valve block-side forward-movement relay port 270P and form a housing-side forward-movement relay port 710P and the other end fluidly connected to the forward-movement clutch 61 of the hydraulic forward/reverse-movement switching device 60.

The housing-side reverse-movement supply/exhaust oil passage 720 has one end open in the first region 161 to be fluidly connected to the valve block-side reverse-movement relay port 275P and form a housing-side reverse/forward-movement relay port 720P and the other end fluidly connected to the reverse-movement clutch 62 of the hydraulic forward/reverse-movement switching device 60.

The tank oil passage 170 has one end open in the first region 161 to be fluidly connected to the drain port 225P and form the tank port 170P and the other end open in inner space of the rear housing 150(2).

In this embodiment, as illustrated in FIG. 12, the main function valve block 200(2) includes an oil reservoir space 285 that can accommodate the solenoid valves 280 through 282, and the oil reservoir space 285 communicates with the drain port 170P.

A connector Ca (see FIGS. 11 and 12) is disposed on a side surface of the main function valve block 200(2), and coils of the solenoid valves 280 through 282 are connected to the connector Ca. A controller mounted in the work vehicle 1 is electrically connected to each of the solenoid valves 280 through 282 through a wire harness and the connector Ca, and thereby, actuation of the solenoid valves 280 through 282 is controlled by the controller.

As illustrated in FIG. 4, for example, the work vehicle 2 of the second example also includes the hydraulic PTO clutch device 110.

Thus, as illustrated in FIGS. 4 and 12, the main function valve block 200(2) used in the second specification also includes the removal oil passage 250, and hydraulic oil taken from the mount surface removal port 250P is supplied to the hydraulic PTO clutch device 110.

Next, the additional function valve block 300(2) will be described.

As illustrated in FIGS. 4, 13, and 14, the additional function valve block 300(2) used in the second specification includes: an additional function main oil passage 310 whose one end is open at the outer surface to form an additional function reception port 310P that receives hydraulic oil from first hydraulic pump 501; a drain oil passage 325 whose one end is open at the outer surface to form a drain port 325P; a valve block-side normal four-wheel oil passage 330 whose one end is open at the outer surface to form a normal four-wheel relay port 330P; a valve block-side acceleration four-wheel oil passage 335 whose one end is open at the outer surface to form an acceleration four-wheel relay port 335P; a valve block-side first brake oil passage 340 whose one end is open at the outer surface to form a first brake relay port 340P; a valve block-side second brake oil passage 345 whose one end is open at the outer surface to form a second brake relay port 345P; a drain oil passage 325 whose one end is open at the outer surface to form a drain port 325P; a normal four-wheel solenoid valve 331 that selectively connects the valve block-side normal four-wheel oil passage 330 to the additional function main oil passage 310 and the drain oil passage 325; an acceleration four-wheel solenoid valve 336 that selectively connects the valve block-side acceleration four-wheel oil passage 335 to the additional function main oil passage 310 and the drain oil passage 325; a first brake solenoid valve 341 that selectively connects the valve block-side first brake oil passage 340 to the additional function main oil passage 310 and the drain oil passage 325; and a second brake solenoid valve 346 that selectively connects the valve block-side second brake oil passage 315 to the additional function main oil passage 310 and the drain oil passage 325.

In this embodiment, as illustrated in FIGS. 4 and 14, the additional function reception port 310P, the drain port 325P, the normal four-wheel relay port 330P, the acceleration four-wheel relay port 335P, the first brake relay port 340P, and the second brake relay port 345P are open at an inner end surface of the additional function valve block 300(2) (a mount surface to be mounted on the second region 162).

In this embodiment, a part of hydraulic oil taken from the removal oil passage 250 of the main function valve block 200(2) is supplied to the additional function reception port 310P of the additional function valve block 300(2).

Specifically, as illustrated in FIGS. 4 and 13, the rear housing 150(2) includes a communication oil passage 165 formed in the front end surface 150a serving as a joint surface to the front housing.

The communication oil passage 165 has one end fluidly connected to the housing-side reception port 175P and the other end open in the second region 162 to form a connection port 165P fluidly connected to the additional function reception port 310P of the additional function valve block 300(2).

In this embodiment, an end of the communication oil passage 165 is fluidly connected to the housing-side reception port 175P through the PTO supply oil passage 180.

In this embodiment, the rear housing 150(2) includes an oil passage fluidly connected to each of the drain port 325P, the normal four-wheel relay port 330P, the acceleration four-wheel relay port 335P, the first brake relay port 340P, and the second brake relay port 345P.

Specifically, as illustrated in FIGS. 4 and 13, the rear housing 150(2) includes a tank oil passage 176 whose one end is open in the second region 162 to be fluidly connected to the drain port 325P and form a tank port 176P and whose other end is open in inner space of the rear housing 150(2).

As illustrated in FIGS. 4 and 13, the rear housing 150(2) further includes: a housing-side normal four-wheel oil passage 730 whose one end is open in the second region 162 to form a normal four-wheel reception port 730P fluidly connected to the normal four-wheel relay port 330P and whose other end is fluidly connected to the normal four-wheel hydraulic clutch 81; a housing-side acceleration four-wheel oil passage 735 whose one end is open in the second region 162 to form an acceleration four-wheel reception port 735P fluidly connected to the acceleration four-wheel relay port 335P and whose other end is fluidly connected to the acceleration four-wheel hydraulic clutch 82; a housing-side first brake oil passage 740 whose one end is open in the second region 162 to form a first brake reception port 740P fluidly connected to the first brake relay port 340P and whose other end is fluidly connected to the first hydraulic brake 70a; and a housing-side second brake oil passage 745 whose one end is open in the second region 162 to form a second brake reception port 745P fluidly connected to the second brake relay port 345P and whose other end is fluidly connected to the second hydraulic brake 70b.

In this embodiment, as illustrated in FIG. 14, the additional function valve block 300(2) includes an oil reservoir space 385 that can accommodate the normal four-wheel solenoid valve 331, the acceleration four-wheel solenoid valve 336, the first brake solenoid valve 341, and the second brake solenoid valve 346, and the oil reservoir space 385 communicates with the drain port 325P.

A connector Cb (see FIGS. 13 and 14) is disposed on one side surface of the additional function valve block 300(2), and coils of the solenoid valves 331, 336, 341, and 346 are connected to the connector. The controller mounted in the work vehicle 1 is electrically connected to each of the solenoid valves 331, 336, 341, and 346 through a wire harness and the connector Cb, and actuation of these solenoid valves is controlled by the controller.

Next, a valve block used in the work vehicle 3 of the third example will be described.

Same reference numerals denote same members in the valve blocks used in the work vehicles 1 and 2 of the first and second examples.

Figure 15:
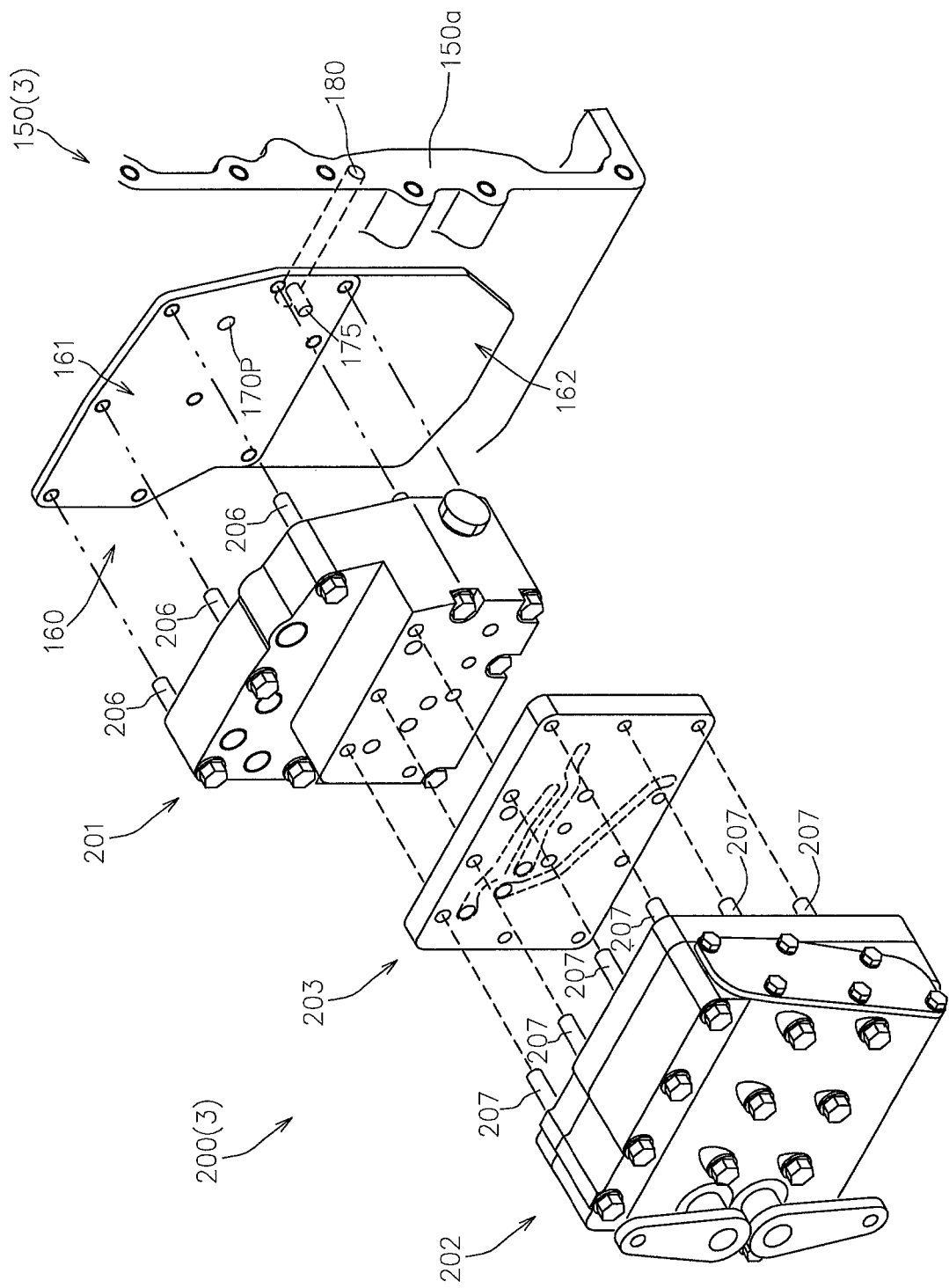
FIG. 15 is a disassembled perspective view of a housing and a main function valve block in the work vehicle of the third example.

FIG. 15 is a disassembled perspective view of a rear housing 150(3) and a main function valve block 200(3) in the work vehicle 3 of the third example.

Figure 16:
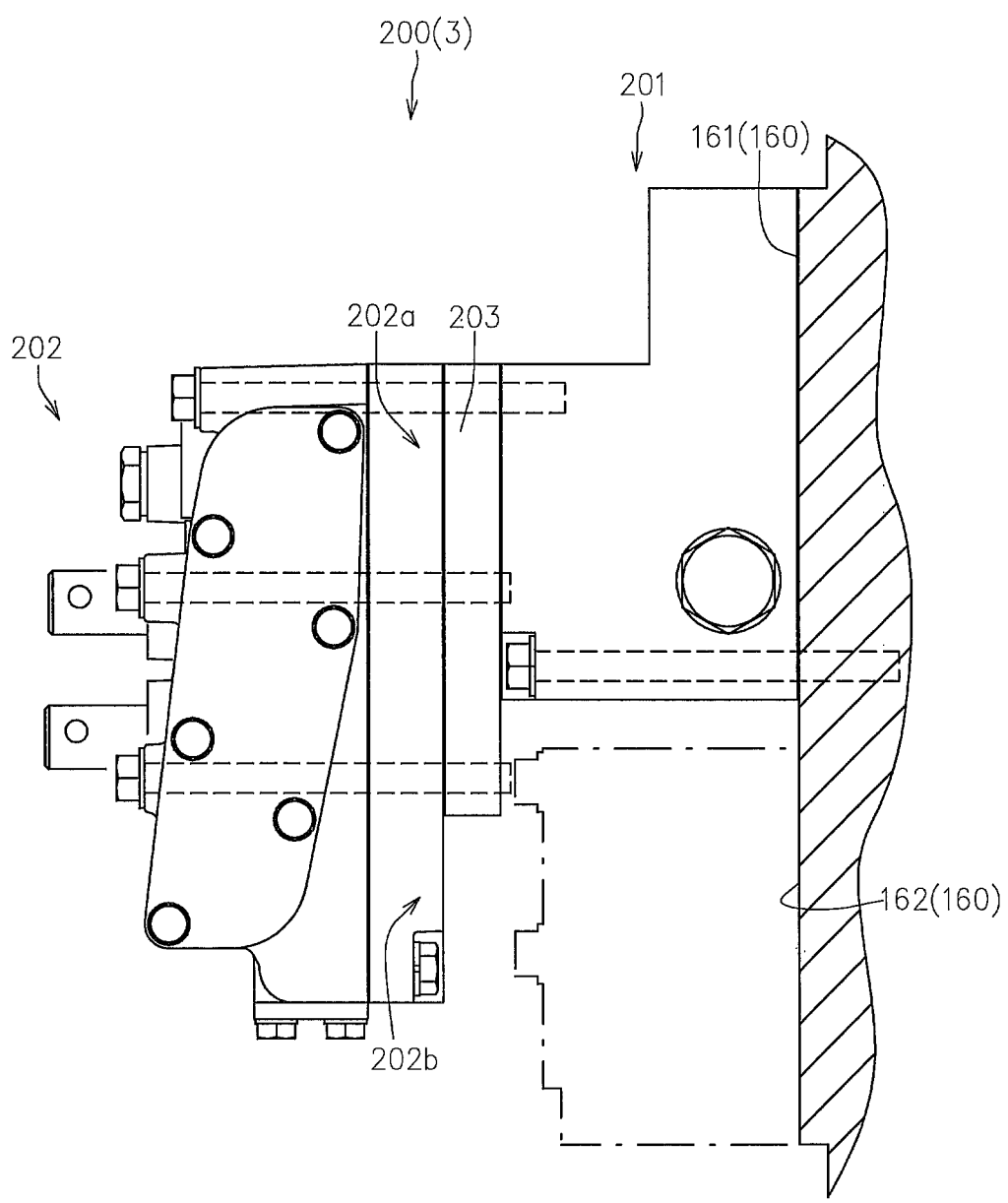
FIG. 16 is a partial end view of the housing, the main function valve block, and the additional function valve block in the work vehicle of the third example when viewed in a direction parallel to a valve block mount surface.

FIG. 16 is a partial end view of a rear housing 150(3), the main function valve block 200(3), and the additional function valve block 300(2) in the work vehicle 3 of the third example when viewed in a direction parallel to the valve block mount surface 160.

Figure 17:
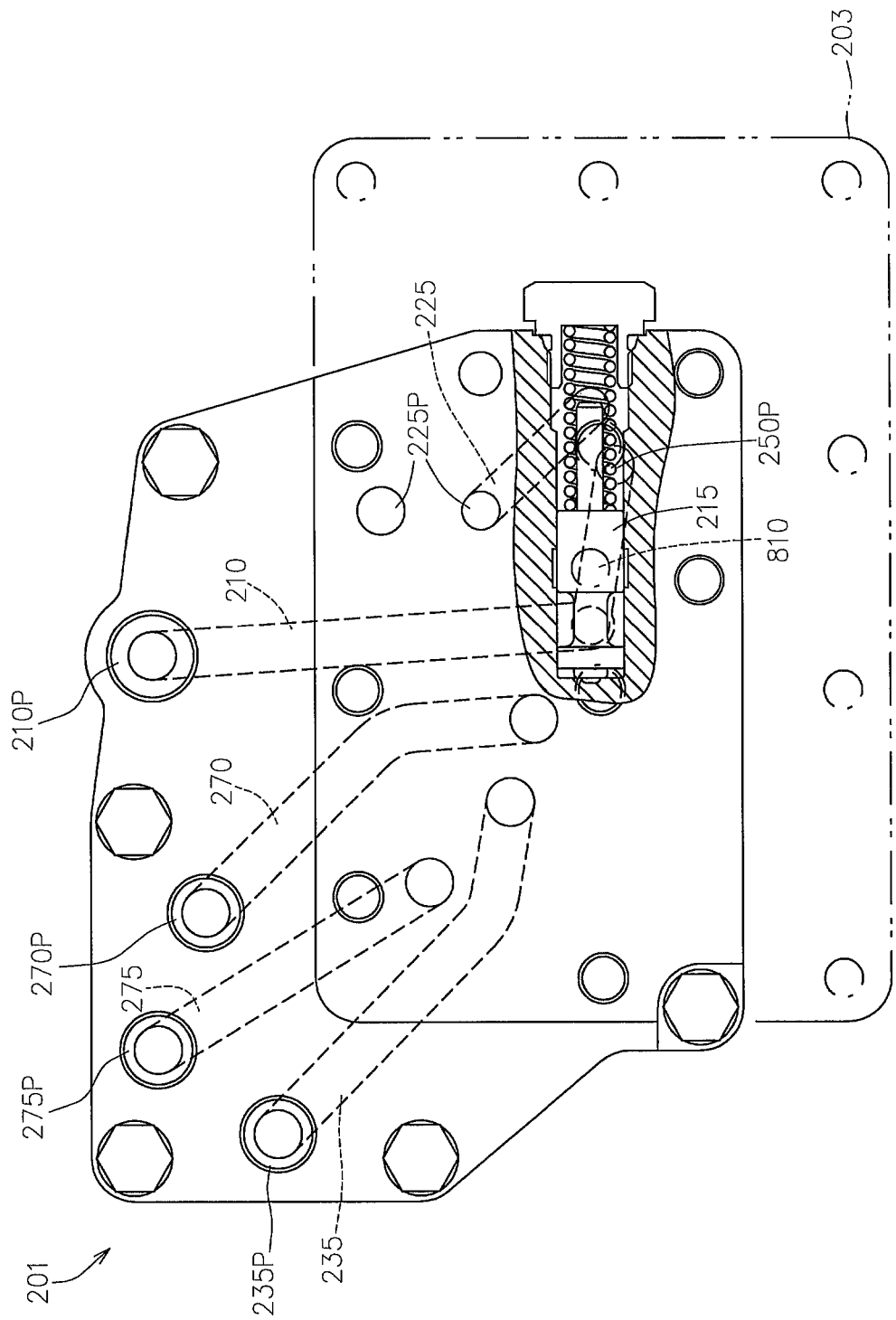
FIG. 17 is a cross-sectional view of a first valve block in the main function valve block included in the work vehicle of the third example.
Figure 18:
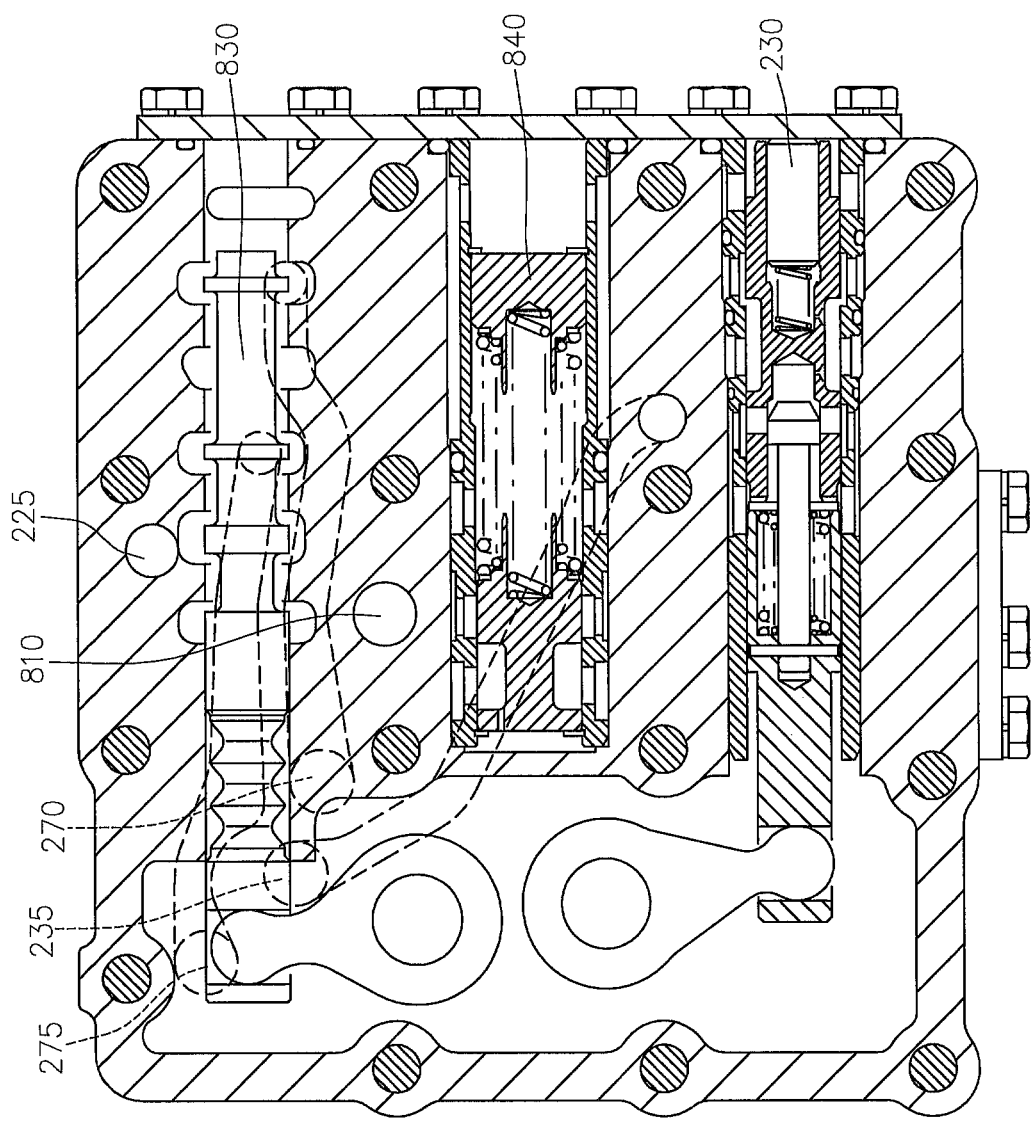
FIG. 18 is a cross-sectional view of a second valve block in the main function valve block included in the work vehicle according to the third embodiment.

FIGS. 17 and 18 are respectively cross-sectional views of first and second valve blocks 201 and 202 in the main function valve block 200(3).

As described above, the work vehicle 3 of the third example conforms to the third specification including the hydraulic forward/reverse-movement switching device 60 as a hydraulic actuator belonging to the main function group, and including the hydraulic brake device 70 and the hydraulic two-wheel drive/four-wheel drive switching device 80 as hydraulic actuators belonging to the additional function group (see FIGS. 5 and 6).

Thus, the work vehicle 3 of the third example includes the main function valve block 200(3) and the additional function valve block 300(2).

The additional function valve block 300(2) in the work vehicle 3 of the third example is identical to the additional function valve block 300(2) in the work vehicle 2 of the second example, and will not be described in detail.

As illustrated in FIGS. 6, 17, and 18, the main function valve block 200(3) used in the third specification includes: the main oil passage 210 whose one end is open at the outer surface to form the reception port 210P that receives hydraulic oil from an oil source; the main relief valve 215 that sets a hydraulic pressure of the main oil passage 210; a valve block-side upstream supply/exhaust oil passage 810 fluidly connected to a secondary side of the main relief valve 215; the drain oil passage 225 whose one end is open at the outer surface to form the drain port 225P; a valve block-side downstream supply/exhaust oil passage 820; the inching valve 230 that selectively connects the valve block-side downstream supply/exhaust oil passage 820 to the valve block-side upstream supply/exhaust oil passage 810 and the drain oil passage 225; the valve block-side forward-movement supply/exhaust oil passage 270 whose one end is open at the outer surface to form the valve block-side forward-movement relay port 270P; the valve block-side reverse-movement supply/exhaust oil passage 275 whose one end is open at the outer surface to form the valve block-side reverse-movement relay port 275P; a forward/reverse-movement change-over valve 830 that performs channel switching between a set of the valve block-side forward-movement supply/exhaust oil passage 270 and the valve block-side reverse-movement supply/exhaust oil passage 275 and a set of the valve block-side downstream supply/exhaust oil passage 820 and the drain oil passage 225; a delay relief valve 840 that sets a hydraulic pressure of the valve block-side upstream supply/exhaust oil passage 810; a lubricating oil passage 235 whose one end is fluidly connected to a secondary side of the delay relief valve 840 and whose other end is open at the outer surface to form a lubricating oil port 235P to the hydraulic forward/reverse-movement switching device 60; a lubricant supply valve 240 inserted in the lubricating oil passage 235 to control a flow rate of the lubricating oil passage 235 in accordance with a hydraulic pressure of the valve block-side downstream supply/exhaust oil passage 820; a lubricant relief valve 245 that sets a hydraulic pressure of the lubricating oil passage 235; and the removal oil passage 250 whose one end is fluidly connected to the main oil passage 210 and whose other end is open at the mount surface to form the mount surface removal port 250P.

In this embodiment, the following configuration is provided to increase the volume of the main function valve block 200(3) to enable accommodation of the valve group while preventing an interference with the additional function valve block 300(2) mounted on the second region 162.

That is, as illustrated in FIGS. 15 through 18, the main function valve block 200(3) includes the first valve block 201 detachably attached to the first region 161 with the fastening member 206 such as a bolt, and the second valve block 202 detachably attached to the first valve block 201 with a fastening member 207 such as a bolt.

As illustrated in FIGS. 15 and 17, the first valve block 201 houses the main relief valve 215 in the valve group, includes the reception port 210P, the valve block-side forward-movement relay port 270P, the valve block-side reverse-movement relay port 275P, and the lubricating oil port 235P in the outer end surface thereof, and includes the drain port 225P in the inner end surface thereof.

As illustrated in FIG. 18, the second valve block 202 houses the inching valve 230, the delay relief valve 840, the forward/reverse-movement change-over valve 830, the lubricant supply valve 240 (not shown), and the lubricant relief valve 245 (not shown).

Here, as illustrated in FIG. 16, the second valve block 202 includes a mount region 202a that is mounted on an outer end surface of the first valve block 201 and an extension region 202b extending outward from the mount region 202a in a direction parallel to the valve block mount surface 160 and covering at least a part of the additional function valve block 300(2).

That is, the first and second valve blocks 201 and 202 are configured in such a manner that in a state where the first valve block 201 is mounted on the first region 161, the second valve block 202 is mounted on the first valve block 201, and the additional function valve block 300(2) is mounted on the second region 162, the extension region 202b overlaps the additional function valve block 300(2) when viewed in a direction orthogonal to the valve block mount surface 160.

This configuration can effectively increase the volume of the main function valve block 200(3) while preventing an interference with the additional function valve block 300(2).

In this embodiment, as illustrated in FIGS. 15 through 17, an intermediate plate 203 including a connection oil passage for connecting oil passages corresponding to the first valve block 201 and the second valve block 202 is interposed between the valve blocks 201 and 202.

REFERENCE SIGNS LIST 1 through 3 work vehicle
15 front wheel (auxiliary drive wheel)
18 rear wheel (main drive wheel)
20 hydraulic traveling clutch device
50 hydraulic stepless transmission device
60 hydraulic forward/reverse-movement switching device
70 hydraulic brake device
80 hydraulic two-wheel drive/four-wheel drive switching device
100 PTO shaft
110 hydraulic PTO clutch device
150(1) through 150(3) transmission case (rear housing)
160 valve block mount surface
161 first region
162 second region
165 communication oil passage
195 PTO change-over valve
200(1) through 200(3) main function valve block
201 first valve block
202 second valve block
202 amount region
202b extension region
210P reception port
220P relay port
250P mount surface removal port
260P valve block-side servo relay port
265P valve block-side charge relay port
270P valve block-side forward-movement relay port
275P valve block-side reverse-movement relay port
300(2) additional function valve block
310P additional function reception port
330P normal four-wheel relay port
335P acceleration four-wheel relay port
340P first brake relay port
345P second brake relay port
501 first hydraulic pump (common oil source)

The invention claimed is:

1. A method for forming hydraulic oil passages for hydraulic actuators, comprising:
classifying various hydraulic actuators mountable in a work vehicle into a main function group for performing a main function of the work vehicle and an additional function group for performing an additional function;
forming a valve block mount surface including first and second regions on an outer surface of a housing, the housing being a component of the work vehicle;
collecting valves for one or more hydraulic actuators that are actually mounted depending on a specification and belong to the main function group to a main function valve block, the main function valve block being mountable directly or indirectly on the first region, and in a case where the one or more hydraulic actuators actually mounted depending on the specification include at least one hydraulic actuator belonging to the additional function group, collecting a valve for the hydraulic actuator belonging to the additional function group to an additional function valve block, the additional function valve block being mountable directly or indirectly on the second region; and mounting each of the valve blocks on a corresponding one of the regions of the valve block mount surface, and thereby, the one or more hydraulic actuators that are actually mounted are fluidly connected to each other so that the one or more hydraulic actuators are operable by using hydraulic oil from a common oil source.

2. The method according to claim 1, wherein a hydraulic actuator for changing a drive state of a drive wheel in the work vehicle is classified into the main function group.

3. The method according to claim 2, wherein the hydraulic actuator for changing the drive state of the drive wheel in the work vehicle includes a hydraulic stepless transmission device that steplessly shifts a drive speed of the drive wheel in the work vehicle, a hydraulic forward/reverse-movement switching device that switches a drive direction of the drive wheel, and/or a hydraulic traveling clutch device that engages or disengages driving of the drive wheel.

4. The method according to claim 1, wherein a hydraulic brake device that exerts a braking force on a drive wheel in the work vehicle is classified into the additional function group.

5. The method according to claim 1, wherein a hydraulic two-wheel drive/four-wheel drive switching device that performs switching between a two-wheel state where either front wheels or rear wheels in the work vehicle are driven and a four-wheel state where both of the front wheels and the rear wheels are driven is classified into the additional function group.

6. The method according to claim 1, wherein in a case where a hydraulic actuator belonging to the additional function group is not mounted in the work vehicle, the second region is a closed surface where no ports are provided.

7. The method according to claim 1, wherein the main function valve block includes a reception port fluidly connected to the common oil source, a relay port to the hydraulic actuator, and a removal port from which at least a part of hydraulic oil that has flowed into the reception port is taken out.

8. The method according to claim 7, wherein in a case where the work vehicle includes a hydraulic PTO clutch device that engages and disengages power transfer from a drive source to a PTO shaft and a PTO change-over valve that controls supply and exhaust of hydraulic oil to and from the hydraulic PTO clutch device, the hydraulic oil taken out from the removal port is supplied to the hydraulic PTO clutch device through the PTO change-over valve.

9. The method for forming hydraulic oil passages for hydraulic actuators according to claim 7, wherein
the additional function valve block includes an additional function reception port that is open at a mount surface to be joined to the second region,
the removal port of the main function valve block includes a mount surface removal port that is open at a mount surface to be mounted on the first region, and
the housing includes a communication oil passage that fluidly connects the mount surface removal port and the additional function reception port to each other.

10. The method according to claim 1, wherein
the main function valve block includes a first valve block that is mounted on the first region and second valve block that is mounted on the first valve block, and
the second valve block includes a mount region that is mounted on an outer end surface of the first valve block and an extension region extending outward from the mount region in a direction parallel to the valve block mount surface and covering at least a part of the additional function valve block that is mounted on the second region.

11. A hydraulic actuator oil passage structure that supplies hydraulic oil from a common oil source to hydraulic actuators provided in a work vehicle, comprising:
a housing having a valve block mount surface including first and second regions on an outer surface;
a main function valve block that accommodates one or more valves for one or more main function hydraulic actuators belonging to a main function group for performing a main function of the work vehicle, the main function valve block including a main function reception port that receives hydraulic oil from the common oil source and a main function relay port fluidly connected to the main function reception port and the main function hydraulic actuators that are operatively controlled by the valves accommodated in the main function valve block;
the first region being configured so that the main function valve block is mountable directly or indirectly thereon;
the second region being configured so that an additional function valve block is mountable directly or indirectly thereon, the additional function valve block accommodating one or more valves for one or more additional function hydraulic actuators belonging to an additional function group for performing an additional function of the work vehicle; and
wherein the main function valve block is mounted on the first region so that the hydraulic oil that has been supplied into the main function reception port from the common oil source is supplied through the main function relay port to the main function hydraulic actuator that is operatively controlled by the valve accommodated in the main function valve block.

12. The structure according to claim 11, wherein one of the main function hydraulic actuators controls a hydraulic stepless transmission device that steplessly shifts a drive speed of the drive wheel in the work vehicle, a hydraulic forward/reverse-movement switching device that switches a drive direction of the drive wheel, and a hydraulic traveling clutch device that engages or disengages driving of the drive wheel.

13. The structure according to claim 11, wherein one of the additional function hydraulic actuators controls a hydraulic brake device that exerts a braking force on a drive wheel in the work vehicle, and a hydraulic two-wheel drive/four-wheel drive switching device that performs switching between a two-wheel state where either front wheels or rear wheels in the work vehicle are driven and a four-wheel state where both of the front wheels and the rear wheels are driven.

14. The structure according to claim 11, wherein the main function valve block further includes a removal port from which at least a part of hydraulic oil that has flowed into the main function reception port is taken out, and
wherein the main function valve block is mounted on the first region so that a part of the hydraulic oil that has been supplied into the main function reception port from the common oil source is supplied through the removal port to a PTO change-over valve and a hydraulic PTO clutch device provided in the work vehicle.

15. A hydraulic actuator oil passage structure that supplies hydraulic oil from a common oil source to hydraulic actuators provided in a work vehicle, comprising:
a housing having a valve block mount surface including first and second regions on an outer surface;

a main function valve block that accommodates one or more valves for one or more main function hydraulic actuators belonging to a main function group for performing a main function of the work vehicle, the main function valve block including a main function reception port that receives hydraulic oil from the common oil source and a main function relay port fluidly connected to the main function reception port and the main function hydraulic actuators that are operatively controlled by the valves accommodated in the main function valve block;

an additional function valve block that accommodates one or more valves for one or more additional function hydraulic actuators belonging to an additional function group for performing an additional function of the work vehicle, the additional function valve block including an additional function reception port that receives hydraulic oil and an additional function relay port fluidly connected to the additional function reception port and the additional function hydraulic actuators that are operatively controlled by the valves accommodated in the additional function valve block;

the first and second regions being configured so that the main function valve block and the additional function valve block are mountable directly or indirectly thereon, respectively;

wherein the main function valve block is mounted on the first region so that the hydraulic oil that has been supplied into the main function reception port from the common oil source is supplied through the main function relay port to the main function hydraulic actuator that is operatively controlled by the valve accommodated in the main function valve block; and wherein the additional function valve block is mounted on the second region so that a part of the hydraulic oil that has been supplied into the main function reception port from the common oil source is supplied to the additional function reception port, and the hydraulic oil supplied to the additional function reception port is supplied through the additional function relay port to the additional function hydraulic actuator that is operatively controlled by the valve accommodated in the additional function valve block.

16. The structure according to claim 15, wherein one of the main function hydraulic actuators controls a hydraulic stepless transmission device that steplessly shifts a drive speed of the drive wheel in the work vehicle, a hydraulic forward/reverse-movement switching device that switches a drive direction of the drive wheel, and a hydraulic traveling clutch device that engages or disengages driving of the drive wheel.

17. The structure according to claim 15, wherein one of the additional function hydraulic actuators controls a hydraulic brake device that exerts a braking force on a drive wheel in the work vehicle, and a hydraulic two-wheel drive/four-wheel drive switching device that performs switching between a two-wheel state where either front wheels or rear wheels in the work vehicle are driven and a four-wheel state where both of the front wheels and the rear wheels are driven.

18. The structure according to claim 15, wherein the main function valve block further includes a removal port from which at least a part of the hydraulic oil that has flowed into the main function reception port is taken out, and wherein the main function valve block is mounted on the first region so that a part of the hydraulic oil that has been supplied into the main function reception port from the common oil source is supplied through the removal port to a PTO change-over valve and a hydraulic PTO clutch device provided in the work vehicle.

* * * * *